(12) United States Patent
Ashdown

(10) Patent No.: US 11,002,606 B2
(45) Date of Patent: May 11, 2021

(54) SPECTRAL LIGHTING MODELING AND CONTROL

(71) Applicant: Suntracker Technologies Ltd., Victoria (CA)

(72) Inventor: Ian Edward Ashdown, West Vancouver (CA)

(*) Notice: Subject to any disclaimer, the term of this patent is extended or adjusted under 35 U.S.C. 154(b) by 70 days.

(21) Appl. No.: 16/500,317

(22) PCT Filed: Jun. 15, 2018

(86) PCT No.: PCT/CA2018/050727
§ 371 (c)(1),
(2) Date: Oct. 2, 2019

(87) PCT Pub. No.: WO2018/227305
PCT Pub. Date: Dec. 20, 2018

(65) Prior Publication Data
US 2021/0003452 A1    Jan. 7, 2021

Related U.S. Application Data

(60) Provisional application No. 62/619,803, filed on Jan. 21, 2018, provisional application No. 62/540,560, (Continued)

(51) Int. Cl.
*G01J 3/50* (2006.01)
*H05B 47/105* (2020.01)
(Continued)

(52) U.S. Cl.
CPC ............ *G01J 3/505* (2013.01); *A01G 7/045* (2013.01); *A01K 63/06* (2013.01); *G01J 3/465* (2013.01); *G05B 13/0265* (2013.01); *H05B 47/105* (2020.01); *G06F 30/20* (2020.01); *G06F 2111/10* (2020.01)

(58) Field of Classification Search
CPC .......... G01J 3/505; G01J 3/465; A01G 7/045; A01K 63/06; G05B 13/0265; G06F 30/20; G06G 2111/10
See application file for complete search history.

(56) References Cited

U.S. PATENT DOCUMENTS

| | | |
|---|---|---|
| 4,928,250 A | 5/1990 | Greenberg et al. |
| 6,690,465 B2 | 2/2004 | Shimizu |
| 8,506,612 B2 | 8/2013 | Ashdown |
| 9,078,299 B2 | 7/2015 | Ashdown |
| 9,955,552 B2 | 4/2018 | Ashdown |

(Continued)

OTHER PUBLICATIONS

ASTM Standard D1535-08, Standard Practice for Specifying Color by the Munsell System, Dec. 6. 2010, Downloaded/printed by University of British Columbia Library pursuant to License Agreement, ASTM International, Conshohocken, PA 19428, United States.

(Continued)

*Primary Examiner* — Anh Q Tran

(57) ABSTRACT

Spectral irradiance distributions are calculated within a virtual environment based on arbitrary light source spectral power distributions. Architectural, horticultural and aquacultural lighting control systems use the calculated results to control both the intensity and spectral power distribution of the electric light sources. Energy consumption may be minimized while maintaining optimal occupant visual comfort and plant health.

27 Claims, 10 Drawing Sheets

Related U.S. Application Data filed on Aug. 2, 2017, provisional application No. 62/520,008, filed on Jun. 15, 2017.

(51) Int. Cl.

| | |
|---|---|
| *A01G 7/04* | (2006.01) |
| *G01J 3/46* | (2006.01) |
| *G06F 30/20* | (2020.01) |
| *A01K 63/06* | (2006.01) |
| *G05B 13/02* | (2006.01) |
| *G06F 111/10* | (2020.01) |

(56) References Cited

U.S. PATENT DOCUMENTS

| | | |
|---|---|---|
| 2004/0070565 A1 | 4/2004 | Nayar et al. |
| 2013/0231905 A1* | 9/2013 | Noguchi .............. H05B 47/11 703/2 |
| 2016/0088802 A1 | 3/2016 | Nicole et al. |
| 2019/0244417 A1* | 8/2019 | Ashdown .............. H05B 47/16 |

OTHER PUBLICATIONS

Fernando Ayala, JoséF. Echávarri, and Pilar Renet, "Use of three tristimulus values from surface reflectance spectra to calculate the principal components for reconstructing these spectra by using only three eigenvectors", Aug. 2006, pp. 2020-2026, vol. 23, No. 8, Journal of Optical Society of America.

Eric Bruneton and Fabrice Neyret, "Precomputed Atmospheric Scattering", Eurographics Symposium on Rendering 2008, vol. 27 (2008), No. 4, The Eurographics Association and Blackwell Publishing Ltd. Published by Blackwell Publishing, Oxford UK and Malden, MA, USA.

Method of Measuring and Specifying Colour Rendering Properties of Light Sources, Technical Report, CIE 13.3-1995, CIE.

Colorimetry, Technical Report, CIE 15:2004 3rd Edition, CIE.

Hugh S. Fairman and Michael H. Brill, The Principal Components of Reflectances, COLOR research and application, 2004, pp. 104-110, Wiley Periodicals, Inc.

David M. Gates, Harry J. Keegan, John C. Schleter, and Victor R. Weidner, Spectral Properties of Plants, Jan. 1965 / vol. 4, No. 1 / Applied Optics, pp. 11-20, Optical Society.

Robert W. G. Hunt and Michael R. Pointer, Measuring Color, Wiley-IS& T Series in Imaging Science and Technology, 2011, 4th edition, John Wiley & Sons, Ltd., pp. 131-133.

CIE Standard Illuminants for Colorimetry, CIE S 005/E-1998, ISO 10526:1999(E), CIE Central Bureau, Vienna, Austria.

Parameter values for the HDTV standards for production and international programme exchange, Recommendation ITU-R BT.709-6 (Jun. 2015), ITU-R Radiocommunication Sector of ITU, Electronic Publication, ITU Geneva.

M. Johkan1, K. Shoji, F. Goto, S. Hahida, T. Yoshihara, Effect of green light wavelength and intensity on photomorphogenesis and photosynthesis in Lactuca sativa, Environmental and Experimental Botany 75 (2012) 128-133, 2011 Elsevier B.V.

Rolf G. Kuehni, Major Color Order Sys/ems and Their Psychophysical Structure, Color Space and its Divisions: Color Order from Antiquity to the Present, Chater 7, pp. 271-310, 2003 by John Wiley & Sons, Inc.

Alberto L. Mancinelli, Phytochrome-Mediated Detection of Changes in Reflected Light, 1990, Plant Physiol. (1991) 95, pp. 144-151.

Sidney M. Newhall, Dorothy Nickerson and Deane B. Judd, Final Report of the O.S.A. Subcommittee on the Spacing of the Munsell Colors, Journal of the Optical Society of America, vol. 33, No. 7, Jul. 1943, pp. 385-418.

William H. Press, Saul A. Teukolsky, William T. Vetterling and Brian P. Flannery, Numerical Recipes in C, The Art of Scientific Computing Second Edition, Published by the Press Syndicate of the University of Cambridge, New York USA, 1988-1992.

Ian Ashdown, Radiosity: A Programmer's Perspective, 2002 byHeart Consultants Limited, Vancouver Canada.

Alexa I. Ruppertsberg and Marina Bloj, Rendering complex scenes for psychophysics using RADIANCE: How accurate can you get? vol. 23, No. 4/ Apr. 2006/J. Opt. Soc. Am. A, pp. 759-768.

The WELL Building Standard V1, 2016 by Delos Living LLC. New York.

\* cited by examiner

SPECTRAL LIGHTING MODELING AND CONTROL

TECHNICAL FIELD

The subject matter of the present invention relates to architectural and horticultural lighting control, specifically modeling and control of the spectral power distribution of color-changing luminaires.

BACKGROUND

The spectral power distribution (SPD) of horticultural and architectural luminaires have until recently been determined by the choice of lamps. For example, fluorescent lamps for architectural applications are available with SPDs that provide either warm white or cool white illumination, corresponding to correlated color temperatures (CCTs) of approximately 3000K and 4200K respectively. The SPDs may vary depending on the lamp manufacturer's choice of phosphors, but the important issue is that the SPDs and hence their perceived colors are constant.

As another example, high-pressure sodium (HPS) lamps used for supplemental electric lighting in horticultural applications such as greenhouses provide yellowish illumination with a corresponding CCT of approximately 2000K. The SPDs may again vary depending on the lamp manufacturer's choice of phosphors, but their SPDs and hence their perceived colors are constant.

Semiconductor light-emitting diodes (LEDs), on the other hand, typically exhibit quasimonochromatic SPDs with full-width half-maximum (FWHM) bandwidths of 15 to 25 nm, and with peak wavelengths ranging from ultraviolet to infrared. By combining red, green, and blue LEDs in a single luminaire, for example, it is possible to control their relative luminous flux outputs and hence the luminaire CCT for color-changing architectural applications, with the user choosing any CCT from warm white (2700K) to cool daylight (6500K). More generally, a full gamut of colors can be achieved by controlling the relative luminous flux outputs of the red, green, and blue LEDs.

A similar approach is advantageous for horticultural applications, particularly indoor plant factories (aka vertical farms) where plants are grown under electric lighting and in controlled environments. LED-based horticultural luminaires typically use blue and red LEDs with peak wavelengths centered on the absorption peaks of chlorophyll A and B to maximize photosynthesis (FIG. 1). Typical peak wavelengths are 450 nm (blue) and 660 nm (red).

However, recent studies have shown that plant health and growth is also dependent on ultraviolet, green, and far-red electromagnetic radiation. Moreover, the optimal SPDs vary not only with plant species, but also with the development of the growing plants. It is therefore advantageous to have color-changing horticultural luminaires where the SPD can be varied as required (for example, US Patent Application Pub. No. 2016/0088802).

In designing architectural and horticultural lighting systems, lighting designers often ignore spectral power distribution considerations and calculate spatial illuminance distributions (measured in footcandles or lux) based on an achromatic white light source and grey surface reflectances. Where color is a consideration (typically for photorealistic renderings for clients), they may employ lighting design software that models architectural surfaces as reflecting and/or transmitting "red," "green," and "blue" light. (Red, green, and blue are primary additive colors that, when mixed in varying proportions, are perceived as any color within the color gamut they define.)

Internally, architectural lighting design programs model surface colors as red-green-blue (RGB) triplets. For example, a specific pink color may be represented as having 79% red reflectance, 54% green reflectance, and 63% blue reflectance. The lighting designer typically chooses the color based on its display by a computer monitor, with the lighting design program calculating the corresponding reflectance values. The program then performs three sets of calculations in parallel to determine the spatial distribution of visible light for each primary color within the architectural environment.

For some lighting design applications, however, the SPD cannot be ignored. For example, human-centric lighting considers the melanopic response of the human eye, which is different from the photopic response that is assumed by architectural lighting design programs (FIG. 2). While the human eye may perceive two different SPDs as having the same CCT, they will elicit different melanopic responses and so have different degrees of influence on the observer's circadian rhythm.

Emerging building codes (such as the WELL Building Standard) are specifying the calculation of melanopic illuminance in architectural environments, which differs from photopic illuminance due to the different spectral responsivities. These codes will require lighting designers to calculate melanopic lumens based on both the SPDs of the light sources (which may include both electric lighting and daylight) and interreflected light from possibly colored surfaces.

For horticultural applications, it has been shown that the peak wavelength of green light can have dramatic effects on the health and growth of plants such as lettuce (e.g., Johkan et al., 2012. "Effect of Green Light Wavelength an Intensity on Photomorphogenesis and Photosynthesis in *Lactuca sativa*," Environmental and Experimental Botany 75:128-133). Knowledge of the SPD of the light received by the plant is therefore an important issue.

As yet another example, the plant photopigment phytochrome is a molecular switch that regulates a long list of plant functions, including seed germination and development, stem elongation, leaf expansion and abscission, photosynthesis development, flowering, ripening, and dormancy. Phytochrome exists in two states, or isoforms. In its ground state (identified as $P_r$), phytochrome strongly absorbs red light in the region of approximately 550 nm to 700 nm (FIG. 3). When it absorbs a "red" photon, however, it changes its physical shape to form its physiologically active state $P_{fr}$. When it is in this state, it may absorb a "far-red" photon (600 nm to 800 nm) and change once again into its $P_r$ state. This bistable behavior makes phytochrome a biochemical switch, with the $P_{fr}$ isoform serving as the signaling state to the plant.

Floriculturists take advantage of this behavior to advance or delay the flowering of plants to ensure a stable market supply of cut flowers. This has traditionally been achieved by exposing the plants to light from incandescent lamps, which are rich in near-infrared radiation. However, floriculturists now have the option of using red (660 nm) and far-red (730 nm) LEDs, with the advantage of much more precise control over plant photomorphogenesis. For floriculturists then, and more generally horticulturists and plant biologists, it is important to know the SPD of the light (or more generally, electromagnetic radiation) received by the plant.

For some horticultural applications, it is sufficient to know the SPD of the light received directly from the light source.

If, for example, the photosynthetic photon flux density (PPFD), expressed in micromoles per second per square meter ($\mu$mol/sec-m$^2$), received by the plants is measured or can be calculated, the spectral PPFD (expressed in $\mu$mol-nm/sec-m$^2$) is directly proportional to the PPFD multiplied on a per-wavelength basis by the SPD.

For other horticultural applications, however, indirect light that has been reflected by one or more surfaces (including plant leaves and soil) is important (e.g., Mancinelli, A. l. 1990. "Phytochrome-Mediated Detection of Changes in Reflected Light," Plant Physiology 95:144-151). If those surfaces are colored, the SPD of the reflected light will differ from that of the direct light. It is therefore necessary to know not only the SPD of the light source, but also the spectral reflectance distributions of any surfaces reflecting significant amounts of light towards the plants. The SPD of the reflected light is then directly proportional to the SPD of the light source multiplied by the spectral reflectance distribution on a per-wavelength basis.

Similarly, the light received directly from the light source may be transmitted through one or more transparent or translucent materials, such as glass or sheet plastic. The SPD of the transmitted light is then directly proportional to the SPD of the light source multiplied by the spectral transmittance distribution of the transparent or translucent material on a per-wavelength basis.

For both architectural and horticultural applications, the infrared spectral reflectance and transmittance distributions of surface materials may also be important. Roughly half of the radiative flux received through solar insolation is in the infrared region of 0.8 to 2.4 microns. With the availability of low-emissivity glass (which is spectrally neutral in the visible spectrum but strongly reflects near-infrared radiation) and infrared-reflective paints, it may be necessary to consider the spectral distributions of these materials when performing solar heat gain calculations.

A brute force approach to modeling spectral power distributions and spectral reflectance and transmittance distributions in lighting design and building energy modeling software programs would be to divide the SPDs of the light sources and the spectral reflectance and transmittance distributions of surface materials into narrow spectral bands of, for example, 5 nm width, and calculate the spatial spectral irradiance or photon flux density distribution for each band. This, however, would require 60 bands for visible light (400 to 700 nm), and 100 bands for horticultural applications (300 nm to 800 nm). Compared to the three RGB bands currently required for architectural lighting calculations, this approach would require 20 to 33 times the amount of memory and considerably increased CPU execution times. (An example using 81 bands is presented in Ruppertsberg, A. I., and M. Bloj, 2006, "Rendering Complex Scenes for Psychophysics Using Radiance: How Accurate Can You Get?", Journal of the Optical Society of America A 23(4):759-768.)

There is therefore a need for a system and a method whereby the SPDs of light sources and the spectral reflectance and transmittance distributions of surface materials may be compactly represented in architectural and horticultural lighting design software, without the excessive memory and CPU execution time requirements of the brute force approach.

The advantages of such a system and method extend beyond those of lighting design and analysis software. One example is a predictive daylight harvesting controller as disclosed in U.S. Pat. Nos. 9,078,299 and 9,955,552. By continually measuring the SPD of daylight and knowing the SPDs of the electric light sources, the controller can be configured to control both the intensity and spectral power distribution of the electric light sources to ensure minimal energy consumption while maintaining optimal occupant visual comfort and health for architectural applications, and optimal conditions for plant health and growth for horticultural applications. A controller can additionally be configured to predict the temporal changes in SPD of daylight near dawn and dusk, and control both the intensity and spectral power distribution of the electric light source such that the optimal temporal sequences of SPDs needed to entrain the circadian or circannual rhythms of plants in a greenhouse environment are provided.

SUMMARY OF INVENTION

The subject matter of the present invention relates to architectural and horticultural lighting control, specifically modeling and control of the spectral power distribution of color-changing luminaires.

Disclosed is a method of predicting a spectral irradiance distribution for an arbitrary position and view direction in a virtual environment, comprising the steps of: 1) calculating the direct spectral irradiance due to one or more light sources with possibly intervening transparent surfaces; 2) calculating the indirect tristimulus irradiance due to reflections from opaque and transparent surfaces; reconstructing a physically plausible relative spectral power distribution from the tristimulus values; 3) multiplying the relative spectral power distribution by the light source spectral power distribution on a per-wavelength basis; 4) scaling the resultant spectral power distribution according to the indirect tristimulus irradiance to obtain the indirect spectral irradiance; and 5) summing the direct and indirect spectral irradiances.

Also disclosed is a system for the control of spectral lighting, wherein a predictive daylight harvesting system determines the spectral irradiance due to direct sunlight and diffuse daylight and controls the spectral power distribution of supplemental electric lighting to ensure minimal energy consumption while maintaining optimal occupant visual comfort and health for architectural applications, and optimal conditions for plant health and growth for horticultural applications.

Also disclosed is a system for the control of spectral lighting, wherein a lighting control system determines the spectral irradiance due to one or more existing light sources and controls the spectral power distributions of a subset of the existing light sources to ensure minimal energy consumption while maintaining optimal occupant visual comfort and health for architectural applications, and optimal conditions for plant health and growth for horticultural applications.

Further disclosed herein is a method of predicting a spectral irradiance distribution for an arbitrary position and arbitrary view direction in a virtual environment, comprising the steps of: calculating, by a processor, a direct spectral irradiance for said position and direction due to one or more light sources illuminating the virtual environment; calculating, by the processor, an indirect spectral irradiance for said position and direction due to reflections from one or more surfaces in the virtual environment, said indirect spectral irradiance calculated as a per-wavelength multiple of the direct spectral irradiance; and summing, by the processor, the direct spectral irradiance and the indirect spectral irradiance to result in the spectral irradiance distribution.

In some embodiments calculating the indirect spectral irradiance comprises assigning RGB triplets to one or more surfaces in the virtual environment based on a reference illuminant; and, for each light source: calculating, by the processor, an indirect tristimulus irradiance for said position and direction due to reflections from one or more surfaces in the virtual environment; reconstructing, by the processor, a physically plausible relative spectral power distribution from the indirect tristimulus irradiance; multiplying, by the processor, said relative spectral power distribution by a spectral power distribution of the light source and the reference illuminant on a per-wavelength basis, to result in a spectral power distribution; and scaling, by the processor, the spectral power distribution according to the indirect tristimulus irradiance to obtain the indirect spectral irradiance for the light source; and summing the indirect spectral irradiances for the light sources.

Further disclosed herein is a system for controlling spectral lighting in an enclosed environment, the system comprising electric lighting and a lighting controller connected to the electric lighting, the lighting controller configured to determine, using a virtual environment that corresponds to the enclosed environment, a spectral irradiance distribution in the enclosed environment by: calculating a direct spectral irradiance for a position and direction due to light sources illuminating the enclosed environment; calculating an indirect spectral irradiance for said position and direction due to reflections from one or more surfaces in the enclosed environment, said indirect spectral irradiance calculated as a per-wavelength multiple of the direct spectral irradiance; and summing the direct spectral irradiance and the indirect spectral irradiance to result in the spectral irradiance distribution. The lighting controller is configured to control, based on the spectral irradiance distribution, a spectral output of the electric lighting to maintain, in the spectral lighting, a spectral composition that meets a predetermined requirement suitable for a life form in the enclosed environment.

Still further disclosed is a lighting controller comprising a processor and computer-readable memory storing computer-readable instructions, which, when executed by the processor cause the lighting controller to predict a spectral irradiance distribution for an arbitrary position and arbitrary view direction in a virtual environment, by: calculating a direct spectral irradiance for said position and direction due to one or more light sources illuminating the virtual environment; calculating an indirect spectral irradiance for said position and direction due to reflections from one or more surfaces in the virtual environment, said indirect spectral irradiance calculated as a per-wavelength multiple of the direct spectral irradiance; and summing the direct spectral irradiance and the indirect spectral irradiance to result in the spectral irradiance distribution.

DETAILED DESCRIPTION

A. Glossary

CIE—International Commission on Illumination

CCT—Correlated color temperature

Eigencolor—an eigenvector of a set of SRDs. An eigencolor may possibly have negative values that make it unrealizable as a physical color.

ITU—International Telecommunications Union

Life form—This includes one or more of a human, a plant, an animal, an aquatic animal and an aquatic plant.

Physically plausible—This refers to something that is calculated but which can exist in reality according to the laws of physics. For example, herein it refers to a calculated SPD, SRD or STD for which each component is zero or positive, i.e. which can be realized by actual physical light sources. In contrast, a physically implausible SPD, SRD or STD would have at least one negative component.

PPFD—Photosynthetic photon flux density

Reference illuminant—This is, for example, a theoretical or standard illuminant used for viewing colors of surfaces such that they appear as defined by their RGB triplet values.

SPD—Spectral power distribution

SRD—Spectral reflectance distribution

STD—Spectral transmittance distribution

View direction—This refers to the direction in which an observer is or would be looking in an environment, a direction in which a sensor is facing in an environment, a direction in which a surface is facing in an environment, or a direction in which a plant canopy is facing in an environment. Irradiance arriving along the view direction at a given position includes irradiance arriving within a 180° angle centered on the view direction.

B. Spectral Distributions

This invention comprises a method and system of predicting and presenting a spectral irradiance distribution within an architectural or horticultural environment, including radiation received directly from one or more light sources and indirectly from radiation reflected from and transmitted by surfaces within the environment.

This invention further comprises a system wherein a predictive daylight harvesting system determines the spectral irradiance due to direct sunlight and diffuse daylight, and controls the spectral power distribution of supplemental electric lighting to ensure minimal energy consumption while maintaining optimal occupant visual comfort and health for architectural applications, and optimal conditions for plant growth and health for horticultural applications Spectral power distributions, and also spectral reflectance and transmittance distributions, are typically represented in tabular form, with each column representing an average value over the range of wavelengths. For example, assuming a wavelength increment of 5 nm, a column labelled 550 nm would represent the average value over the wavelength range of 547.5 nm to 552.5 nm. For some applications, smaller wavelength increments of 1 or 2 nm may be required.

Figure 1:
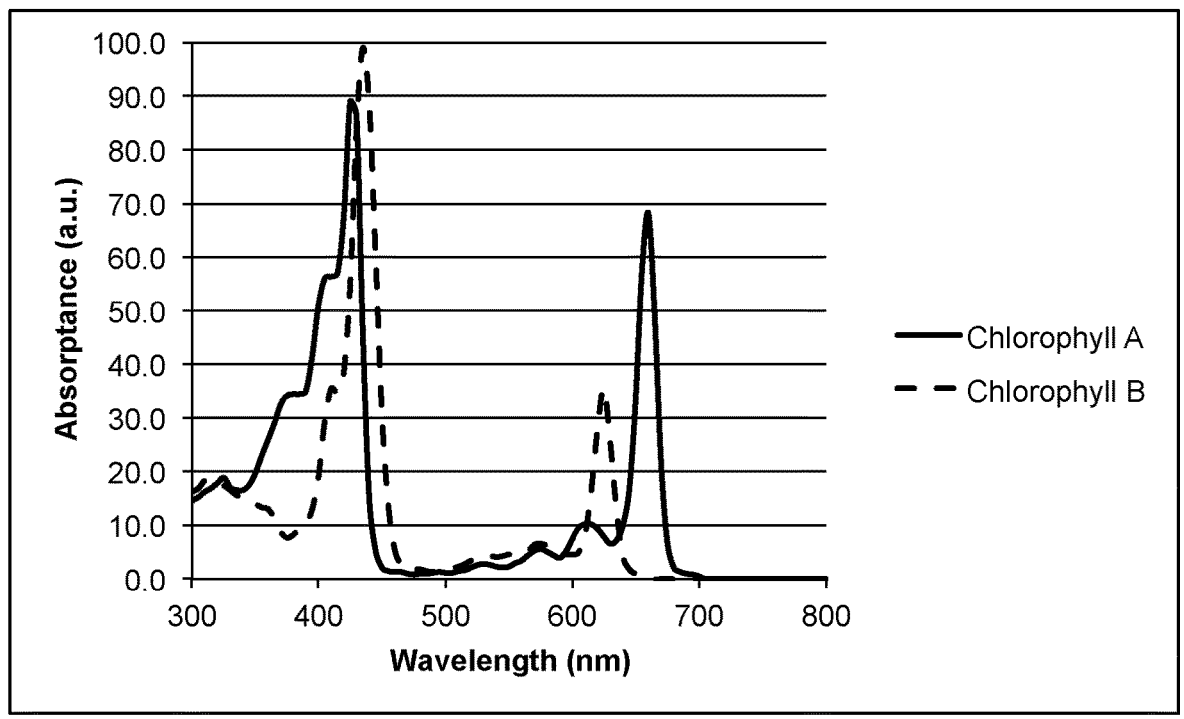
FIG. 1 shows the spectral absorptances of plant photopigments chlorophyll A and chlorophyll B.
Figure 2:
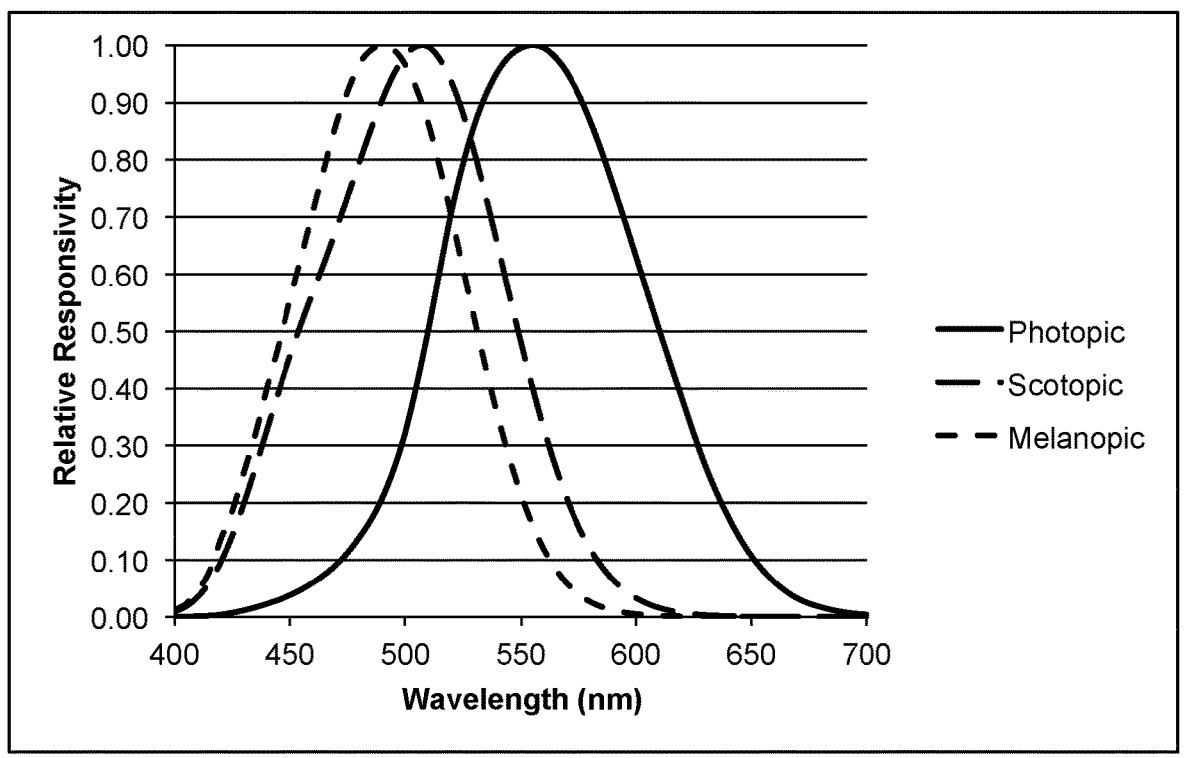
FIG. 2 shows the photopic, scotopic and melanopic spectral responsivity functions of the human visual system.
Figure 3:
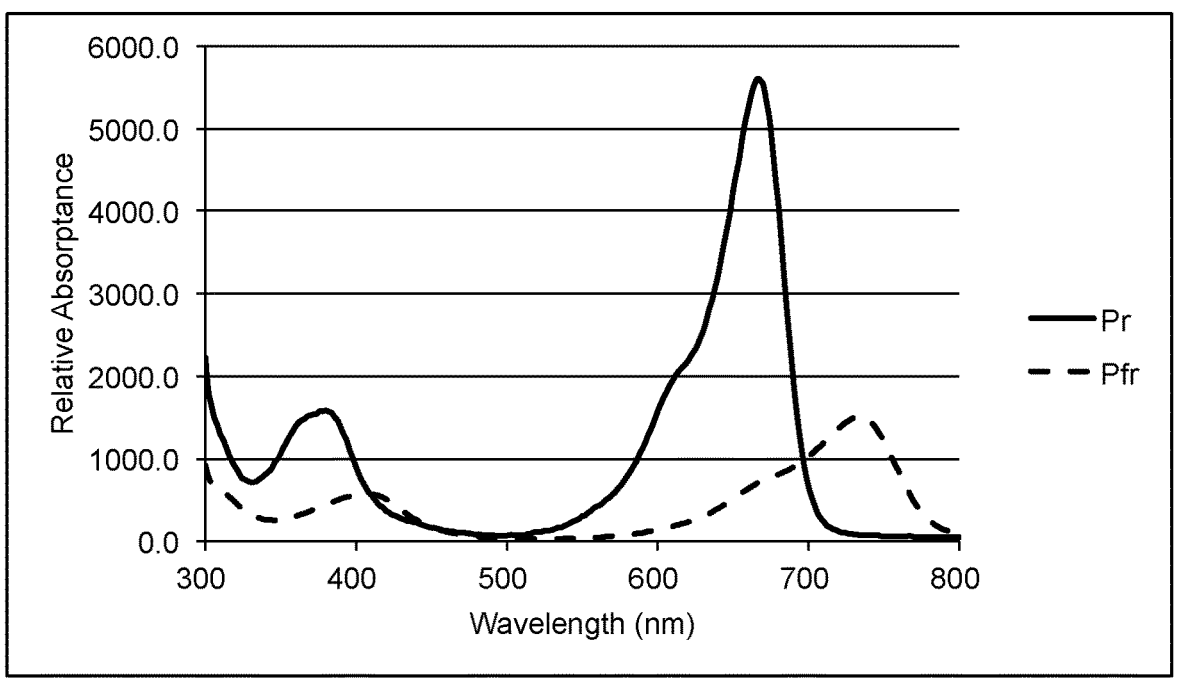
FIG. 3 shows the spectral absorptances of plant photoreceptors phytochrome $P_r$ and $P_{fr}$.
Figure 4:
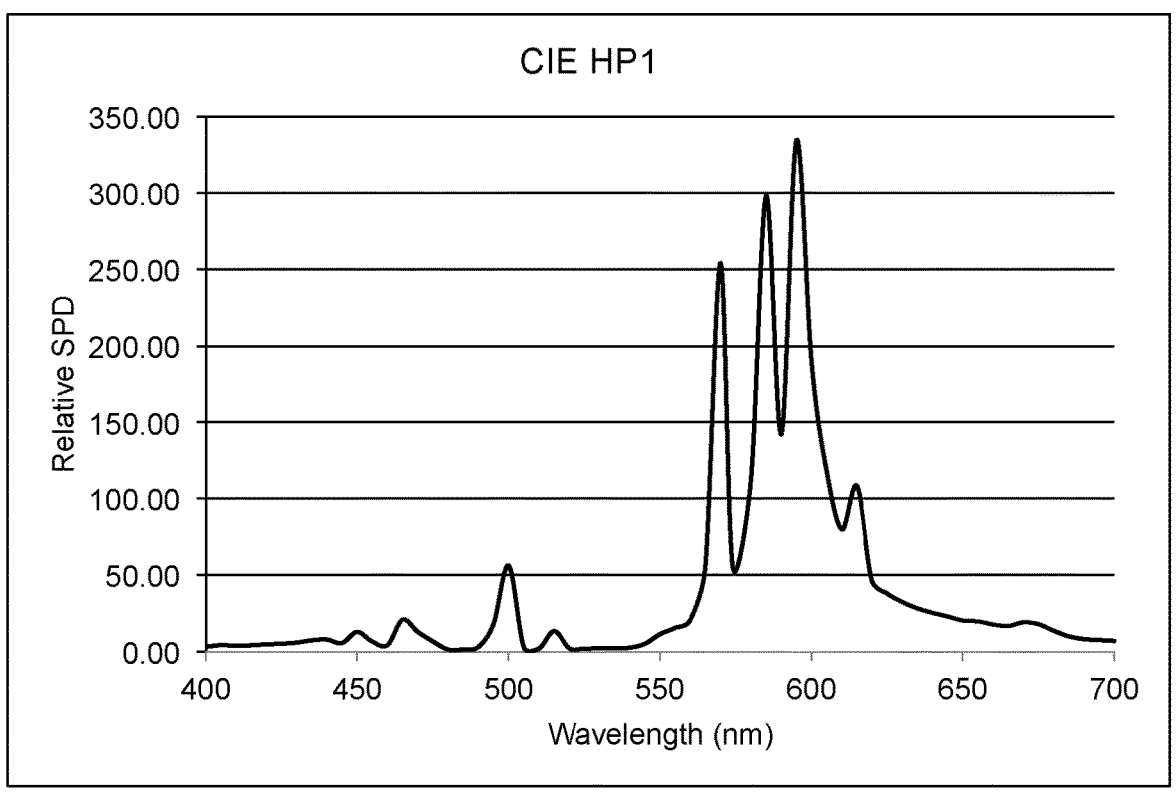
FIG. 4 shows the spectral power distribution of a typical high-pressure sodium lamp.

Fluorescent and high-intensity discharge lamps typically have SPDs that exhibit continuous and line spectrum features. FIG. 4, for example, shows the spectral power distribution of a typical high-pressure sodium lamp. Wavelength increments of 5 nm or less are needed to accurately represent such spectra.

Figure 5:
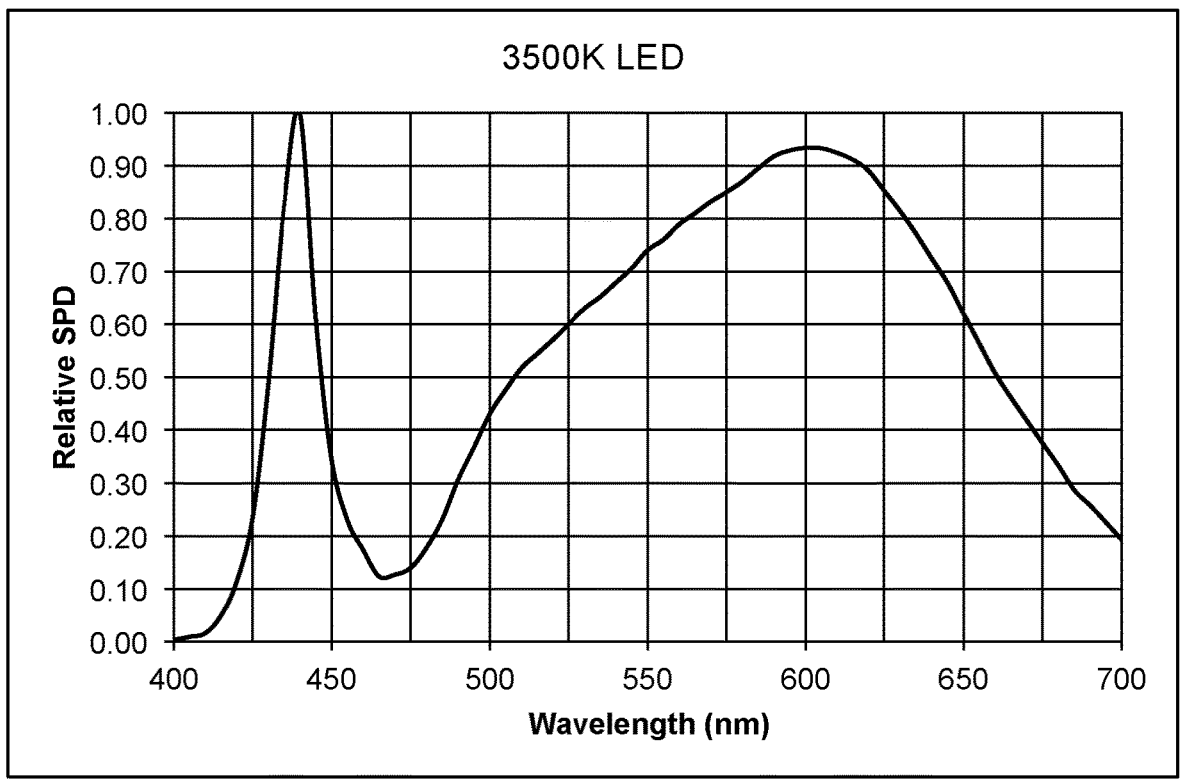
FIG. 5 shows the spectral power distribution of a typical 3500K white light LED.

White light LEDs, comprised of a blue-emitting semiconductor LED with a yellow-emitting phosphor coating, exhibit similar spectral features. FIG. 5, for example, shows the SPD of a 3500K white light LED comprised of a 440 nm "pump" LED with a combination of green- and red-emitting phosphors. In order to accurately calculate the spatial distribution of melanopic illuminance within an architectural environment, wavelength increments of 5 nm or less are needed.

Figure 6:
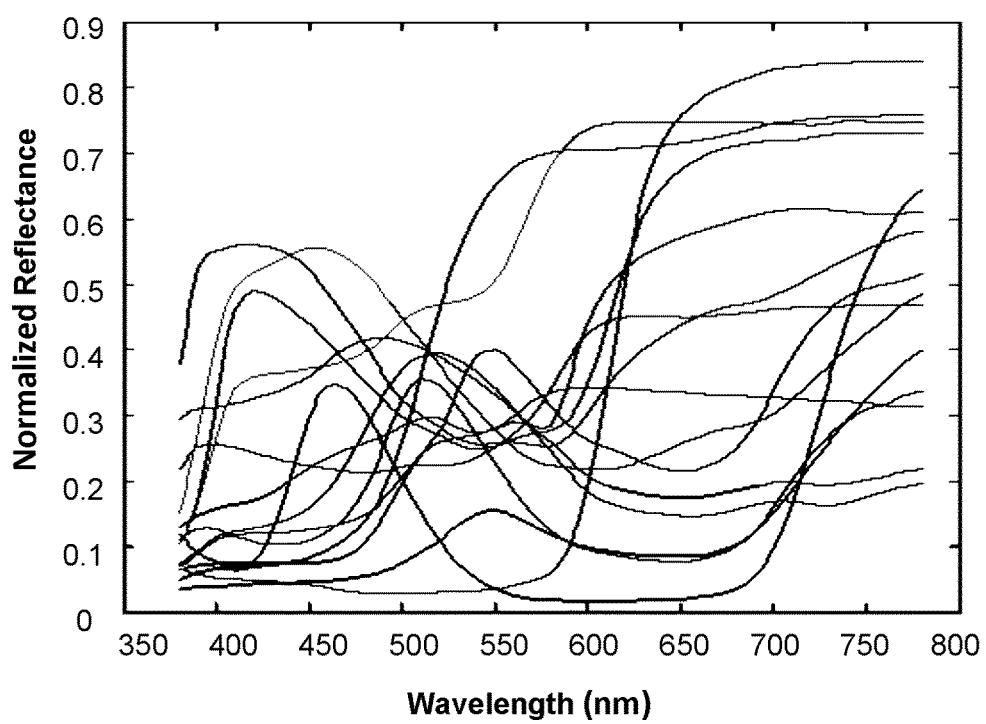
FIG. 6 shows the spectral reflectance distributions of 15 sample colors used for color rendering index (CRI) calculations.

In contrast to most light source SPDs, the spectral reflectance distributions (SRDs) of most architectural materials and finishes are remarkably smooth. FIG. 6, for example, shows the SRDs of fifteen color samples used to calculate the color rendering indices (CRIs) of light source in accordance with CIE 13.3-1995, Method of Measuring and Specifying Colour Rendering of Light Sources, Third Edition. An analysis of 3,534 color samples from the Munsell Book of Color and other color books shows similarly smooth distributions (e.g., Fairman, H. S., and M. H. Brill. 2004, "The Principal Components of Reflectances," Color Research and Application 29(2):104-110). Studies of the SRDs of plants (e.g., Gates, D. M., et al. 1965, "Spectral Properties of Plants," Applied Optics 4(1):11-20) indicate that they are similarly smooth. Still, wavelength increments of 10 nm or less are needed to accurately represent these SRDs.

Figure 7:
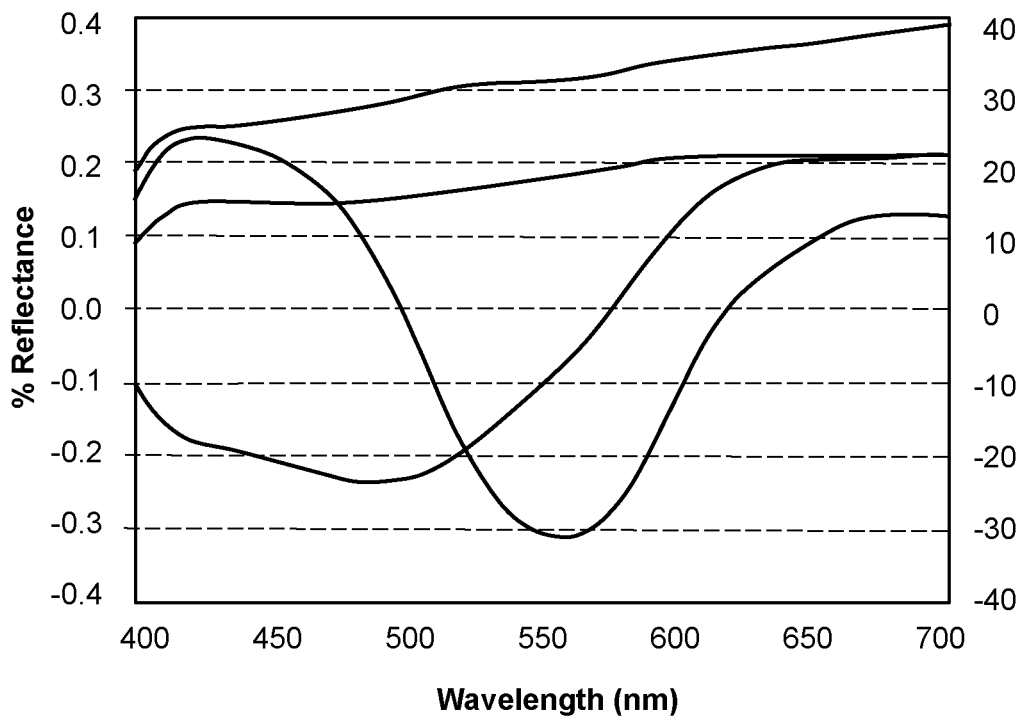
FIG. 7 shows the mean and first three principal components of a large set of color samples.
Figure 8:
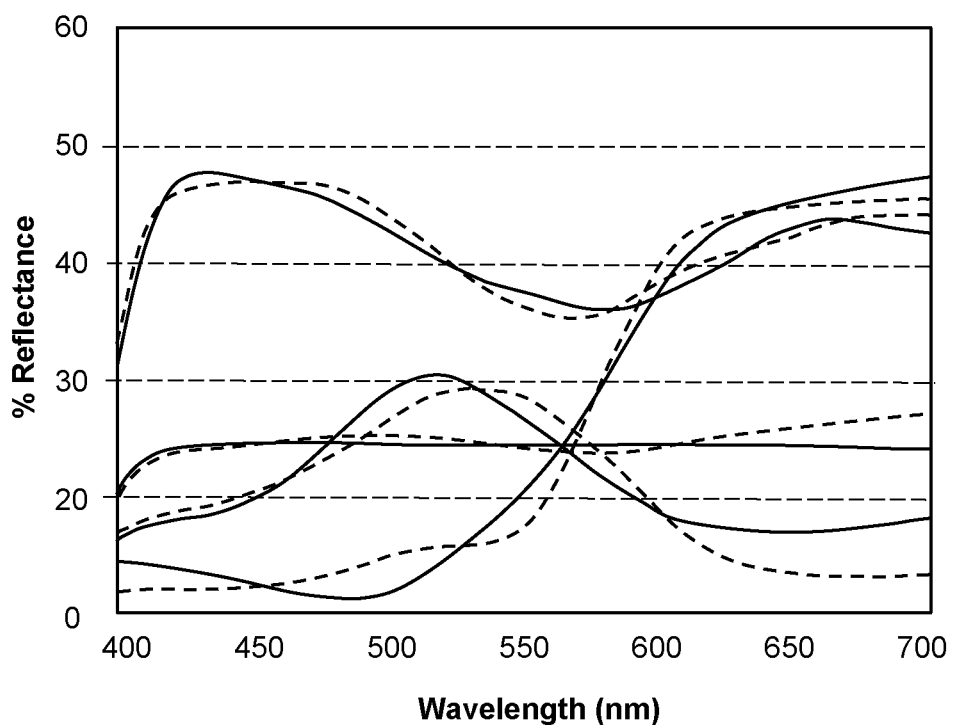
FIG. 8 shows the reconstruction errors for four randomly-selected color samples using the mean and first three principal components.
Figure 9:
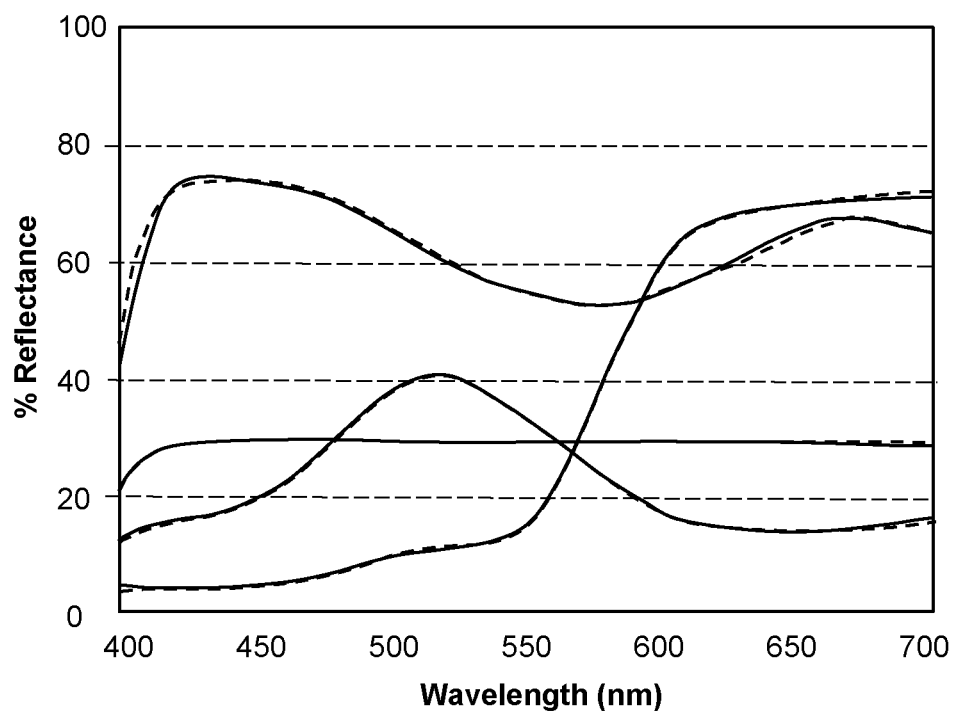
FIG. 9 shows the reconstruction errors for four randomly-selected color samples using the mean and first six principal components.

It is known, however, that these SRDs can be represented with insignificant errors by the mean and three to six principal components of the set of all sample color SRDs. For example, FIG. 7 shows the mean and first three principal components of the set of 3,534 color samples considered by Fairman and Brill [2004]. FIG. 8 shows the reconstruction errors for four randomly-selected color samples using the mean and first three principal components, while FIG. 9 shows the reconstruction errors for four randomly-selected color samples using the mean and first six principal components.

Most architectural lighting design and analysis software programs, for example AGi32 and ElumTools from Lighting Analysts (Littleton, Colo.), enable users to represent material colors as a triplet of values representing red, green, and blue (RGB), wherein the users either visually choose colors as displayed on a calibrated display monitor or from tabular data representing, for example, Munsell™ or Pantone™ colors for architectural finishes. In either case, the reference illuminant is CIE D65 daylight, as specified by ISO 10526/CIE S 005, CIE Standard Illuminants for Colorimetry, and with display monitors calibrated in accordance with ITU-R Rec. BT.709-6, Parameter Values for the HDTV Standards for Production and International Programme Exchange.

While an ITU Rec. 709 RGB triplet is device-dependent (i.e., the display monitor), it can be converted into device-independent CIE tristimulus values XYZ using the linear transformation:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix} \quad (1)$$

and the inverse transformation:

$$\begin{bmatrix} R \\ G \\ B \end{bmatrix} = \begin{bmatrix} 3.2405 & -1.5371 & -0.4985 \\ -0.9693 & 1.8760 & 0.0416 \\ 0.0556 & -0.2040 & 1.0572 \end{bmatrix} \begin{bmatrix} X \\ Y \\ Z \end{bmatrix} \quad (2)$$

with device independent CIE chromaticity values xy given by:

$$x = X/(X+Y+Z)$$

$$y = Y/(X+Y+Z) \quad (3)$$

A particular advantage of the SRD reconstruction method of Fairman and Brill [2004] is that, given a color that is specified by its ITU Rec. 709 RGB triplet with corresponding CIE chromaticity values xy, the reconstructed spectrum is guaranteed to have the same chromaticity values. In the sense then that only the RGB triplet of the specified color is initially known, no information is lost in reconstructing a corresponding spectral reflectance distribution.

This is not to say that an SRD reconstructed from a specific ITU Rec. 709 RGB triplet represents the SRD of a particular material. Rather, the reconstructed SRD represents a physically plausible spectral reflectance distribution for a material with the same CIE chromaticity values. In the absence of measured SRDs, this is sufficient for most architectural and horticultural lighting design and analysis applications.

Figure 10:
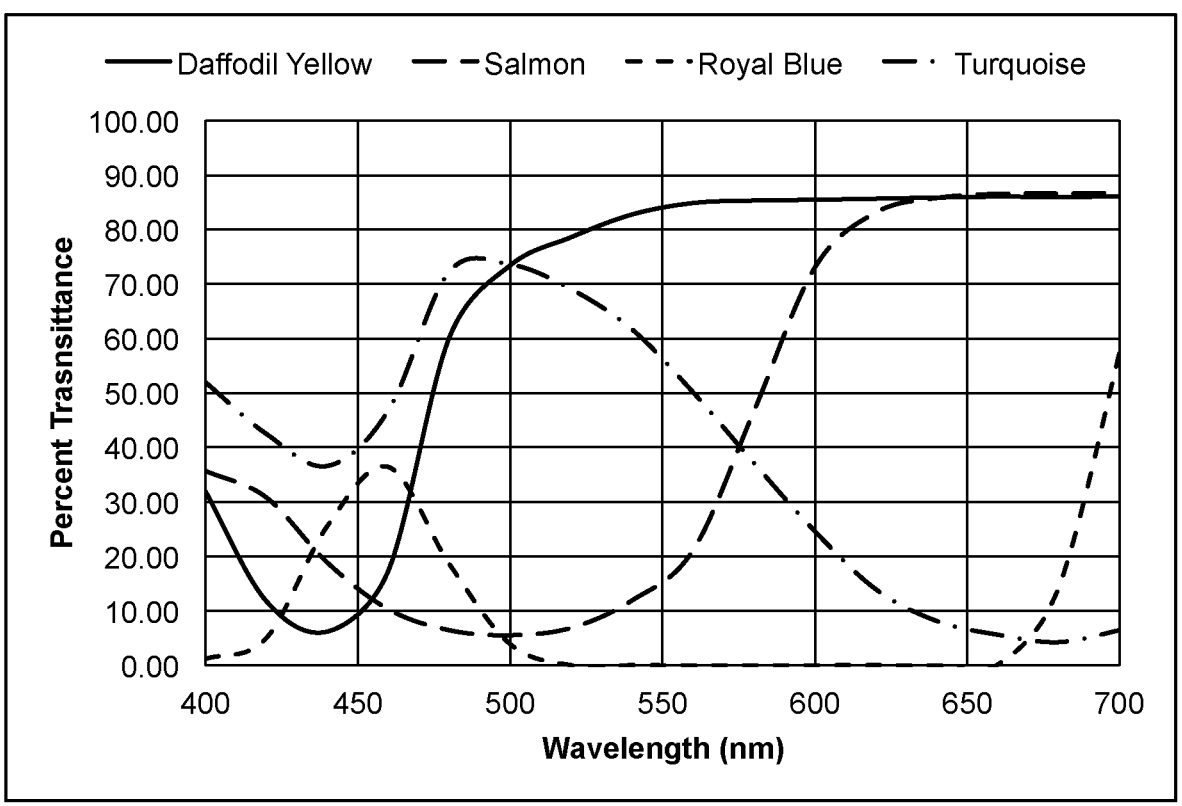
FIG. 10 shows the spectral transmittance distributions of several representative theatrical color gels.

In contrast, the measured spectral transmittance distributions (STDs) of transparent materials are not necessarily smooth. While the STDs of over 3,800 glazing products listed in the International Glazing Database (lbl.gov) are smooth, they are also substantially colorless. Strongly-colored theatrical color gels such as those manufactured by Rosco (Stamford, Conn.), on the other hand, may exhibit STDs such as those shown in FIG. 10 that require five to six principal components to accurately represent.

Assuming that a specific transparent material has a smooth STD (which describes most architectural and horticultural glazing products) with a specified ITU Rec. 709 RGB triplet (likely chosen by the user from a visual display), it is reasonable to reconstruct the STD using a natural cubic spline with the RGB triplet values as knots. There is no guarantee that the CIE chromaticity values of the reconstructed STD will match those of the RGB values, but they will likely be close enough for practical purposes.

C. Spectral Reflectance Reconstruction

In one embodiment, the measured spectral reflectance distributions for a set of opaque materials, such as for example color samples from the Munsell Book of Color, may be represented in tabular or matrix form. This representation may be understood to represent an n-dimensional vector, where n is the number of columns. Thus, a tabular or matrix representation of an SRD from 400 nm to 700 nm in 5 nm increments would have 61 columns and thus represent a vector in a 61-dimensional space. Given a set of M SRDs represented in tabular form with n columns, each SRD represents a vector in the n-dimensional space. Each SRD is denoted $R_m(\lambda)$, where $1 \leq m \leq M$ and $1 \leq \lambda \leq n$ is the vector column index.

Following Fairman and Brill [2004], the mean spectral power distribution $V_0(\lambda)$ is determined by:

$$V_0[\lambda] = (1/M) \Sigma_{m=1}^{M} R_m(\lambda) \quad (4)$$

An n×n covariance matrix D is then computed by:

$$D[\lambda,\lambda'] = \Sigma_{m=1}^{M} [R_m[\lambda] - V_0[\lambda]][R_m[\lambda'] - V_0[\lambda']] \text{ for } 1 \leq \lambda, \lambda' \leq n \quad (5)$$

The n eigenvectors $V_i[\lambda]$ and their corresponding eigenvalues of the covariance matrix are then determined using known techniques such as, for example, the tred2 and tqli algorithms described in Chapter 11, Eigensystems, of Press, W. H., et al. 1992, Numerical Recipes in C: The Art of Scientific Computation, Second Edition, New York, N.Y.: Cambridge University Press. These eigenvectors, ranked by their eigenvalues, are the principal components of the set of M SRDs. The ratio of the sum of the first k eigenvalues to the total of all n eigenvalues represents the variance represented by the first k principal components.

Each eigenvector of a set of SRDs is itself a spectral reflectance distribution, albeit with possibly negative values (for example, FIG. 7) that make it unrealizable as a physical color. As such, it may be referred to as an "eigencolor."

The k eigencolors having the largest associated eigenvalues will be the first k principal components of the set of spectral reflectances. If these eigencolors are represented by a column-wise matrix V, then any spectral distribution R from the set $R_m$ can be expressed as:

$$R' \approx V_0 + VD \quad (6)$$

where D is a column vector of k weights, and where the approximately-equals sign indicates that R' is the least-squares best approximation of R. Expressed algebraically, this becomes:

$$R \approx V_0 + d_1 V_1 + \ldots + d_k V_k \quad (8)$$

Rearranging Equation 6 and multiplying by $V^T$, we have:

$$V^T V D \approx V^T (R - V_0) \quad (8)$$

However, the columns of V are orthonormal, and so $V^T V$ is the k×k identity matrix. Thus:

$$D = V^T (R - V_0) \quad (9)$$

for the least-squares best approximation of R.

Now, given a specified illuminant-observer combination (e.g., CIE Illuminant D65, designated C, and CIE 1931 2° observer with cone response functions $\bar{r}$, $\bar{g}$, and $\bar{b}$) as defined in CIE 15:2004, Colorimetry, we have:

$$Q = \begin{bmatrix} X \\ Y \\ Z \end{bmatrix} = \frac{1}{k} \begin{bmatrix} \Sigma_{400}^{700} C[\lambda] R[\lambda] \bar{r}[\lambda] \\ \Sigma_{400}^{700} C[\lambda] R[\lambda] \bar{g}[\lambda] \\ \Sigma_{400}^{700} C[\lambda] R[\lambda] \bar{b}[\lambda] \end{bmatrix} \quad (10)$$

where $$k = \Sigma_{400}^{700} C[\lambda] \bar{g}[\lambda] \quad (11)$$

and which can be expressed as:

$$Q = A^T R \quad (12)$$

which, substituted in Equation 6, gives:

$$Q' \approx A^T V_0 + A^T V D \quad (13)$$

where $A^T V_0$ is a vector representing the tristimulus values of the mean reflectance spectrum $V_0$, and $A^T V$ is a matrix representing the tristimulus values of the first three principal components:

$$A^T V = \begin{bmatrix} X_1 & X_2 & X_3 \\ Y_1 & Y_2 & Y_3 \\ Z_1 & Z_2 & Z_3 \end{bmatrix} \quad (14)$$

Solving for D:

$$D = (A^T V)^{-1} (Q - A^T V_0) \quad (15)$$

Thus, given a target set of tristimulus values Q, a reflectance whose tristimulus values are the best-fit approximation to Q is given by:

$$R' = V_0 + d_1 V_1 + d_2 V_2 + d_3 V_3 \quad (16)$$

D. Different Illuminants

One difficulty with the approach of Fairman and Brill [2004] is that the target set of tristimulus values Q is dependent on the choice of illuminant and observer. Fairman and Brill, for example, chose CIE Illuminant C rather than D65.

To address this issue, ITU Rec. 709 RGB values must be first be linearly transformed to CIE tristimulus values XYZ assuming CIE Illuminant D65, and then mapped to XYZ tristimulus values XYZ assuming CIE Illuminant C using the chromatic adaptation algorithm CIE CAT02 (e.g., Hunt, R. W. G., and M. R. Pointer, 2001, Measuring Color, Fourth Edition, John Wiley & Sons, pp. 131-133) or a similar chromatic adaptation algorithm.

Given an ITU Rec. 709 RGB triplet, it is first converted to CIE tristimulus values XYZ (assuming CIE Illuminant D65) using Equation 1. The cone responses are then given by the CAT02 transformation:

$$\begin{bmatrix} r_D \\ g_D \\ b_D \end{bmatrix} = \begin{bmatrix} 0.7328 & 0.4296 & -0.1624 \\ -0.7036 & 1.6975 & 0.0061 \\ 0.0030 & 0.0136 & 0.9834 \end{bmatrix} \begin{bmatrix} X_D \\ Y_D \\ Z_D \end{bmatrix} \quad (17)$$

From CIE 15:2004, the chromaticities and tristimulus values of the CIE D65 illuminant are defined as:

$X_{WD} = 95.04$
$Y_{WD} = 100.00$
$Z_{WD} = 108.88$
$x_{WD} = 0.31271$
$y_{WD} = 0.32904$ and those of CIE Illuminant C are defined as:

$X_{WC} = 98.07$
$Y_{WC} = 100.00$
$Z_{WC} = 118.22$
$x_{WC} = 0.31006$
$y_{WC} = 0.31616$

Thus, the corresponding cone responses for CIE illuminants D65 and C (the "white points") are:

$$\begin{bmatrix} \bar{r}_{WD} \\ \bar{g}_{WD} \\ \bar{b}_{WD} \end{bmatrix} = \begin{bmatrix} 0.7328 & 0.4296 & -0.1624 \\ -0.7036 & 1.6975 & 0.0061 \\ 0.0030 & 0.0136 & 0.9834 \end{bmatrix} \begin{bmatrix} X_{WD} \\ Y_{WD} \\ Z_{WD} \end{bmatrix} \quad (18)$$

$$\begin{bmatrix} \bar{r}_{WC} \\ \bar{g}_{WC} \\ \bar{b}_{WC} \end{bmatrix} = \begin{bmatrix} 0.7328 & 0.4296 & -0.1624 \\ -0.7036 & 1.6975 & 0.0061 \\ 0.0030 & 0.0136 & 0.9834 \end{bmatrix} \begin{bmatrix} X_{WC} \\ Y_{WC} \\ Z_{WC} \end{bmatrix} \quad (19)$$

Assuming unknown ambient luminance for the display device, the degree of chromatic adaptation D is chosen as 0.95, and so the degree of adaptation factors are:

$$D_r = D\left(\frac{Y_{WD}\bar{r}_{WC}}{Y_{WC}\bar{r}_{WD}}\right) + 1 - D$$

$$D_g = D\left(\frac{Y_{WD}\bar{g}_{WC}}{Y_{WC}\bar{g}_{WD}}\right) + 1 - D$$

$$D_b = D\left(\frac{Y_{WD}\bar{b}_{WC}}{Y_{WC}\bar{b}_{WD}}\right) + 1 - D \quad (20)$$

The corresponding cone responses for CIE Illuminant C are thus:

$$\bar{r}_C = D_r \bar{r}_D$$

$$\bar{g}_C = D_g \bar{g}_D$$

$$\bar{b}_C = D_b \bar{b}_D \quad (21)$$

and the tristimulus values for CIE Illuminant C are:

$$\begin{bmatrix} X_C \\ Y_C \\ Z_C \end{bmatrix} = \begin{bmatrix} 1.0961 & -0.2779 & 0.1827 \\ 0.4544 & 0.4735 & 0.0721 \\ -0.0096 & -0.0057 & 1.0153 \end{bmatrix} \begin{bmatrix} \bar{r}_C \\ \bar{g}_C \\ \bar{b}_C \end{bmatrix} \quad (22)$$

E. Segmented Color Space

Another difficulty with the approach of Fairman and Brill [2004] is that the principal components are derived from all color samples in the Munsell Book of Color and other color books. Similar colors may have similar SRDs, but this information is necessarily lost when three eigencolors are used to represent all colors.

A different approach, as presented in Ayala, R., J. F. Echávarri, and P. Penet. 2006, "Use of Three Tristimulus Values from Surface Reflectance Spectra to Calculate the Principal Components for Reconstructing these Spectra by Using Only Three Eigenvectors," Journal of the Optical Society of America 23(8):2020-2016, is to divide the set of Munsell colors into its ten hue groups:
  Green-Yellow (GY)
  Green (G)
  Blue-Green (BG)
  Blue (B)
  Purple-Blue
  Purple (P)
  Red-Purple (RP)
  Red (R)
  Yellow-Red (YR)
  Yellow (Y)

Figure 11:
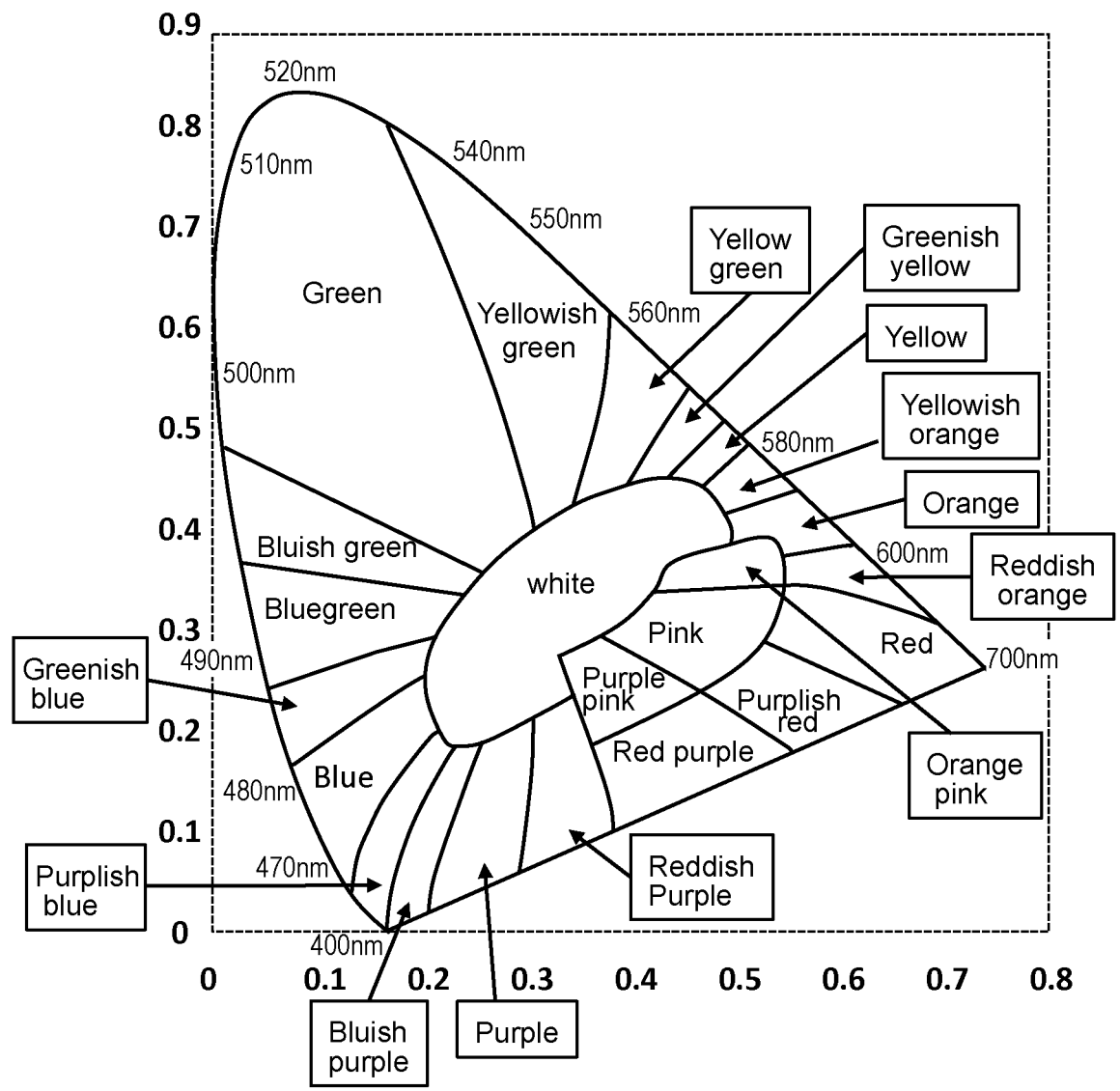
FIG. 11 shows the subdivision of the CIE 1931 color gamut into Munsell hue groups.
Figure 12:
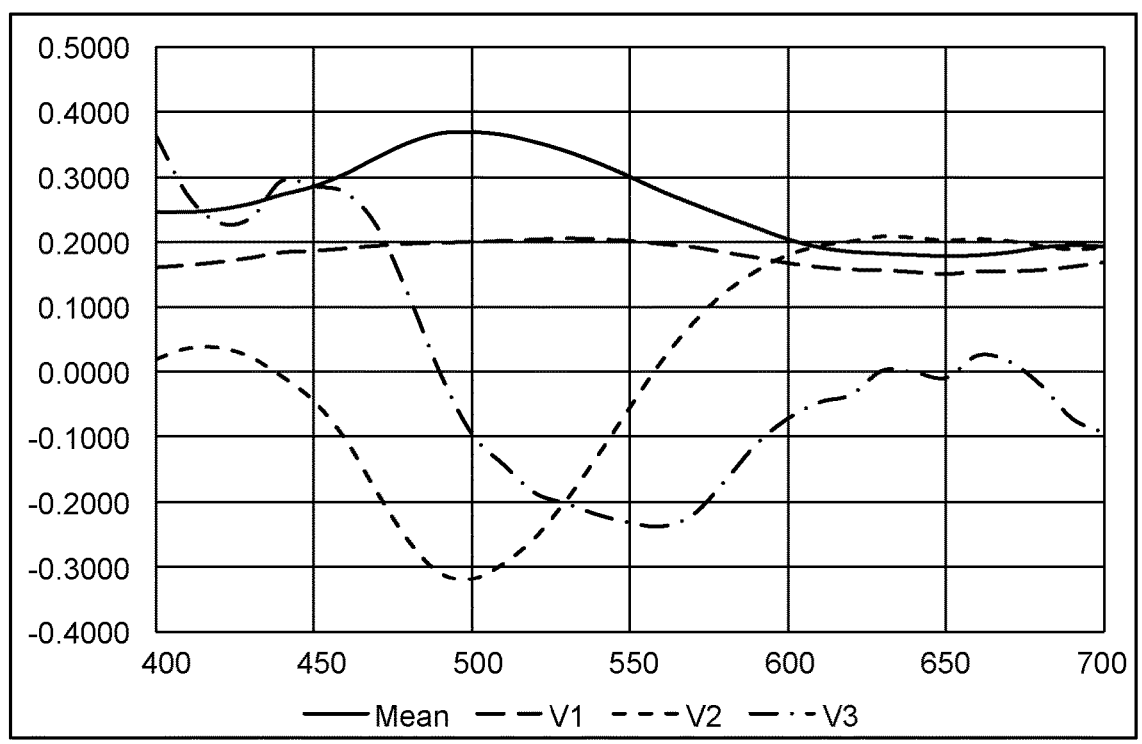
FIG. 12 shows the mean and dominant eigencolors of the Munsell blue-green hue group.

(a set of more groups is shown in FIG. 11) and perform principal components analysis on each group independently to determine their mean spectra and dominant eigencolors. The mathematics are to the same as that of Fairman and Brill [2004], apart from the need to choose the appropriate hue group for a given ITU Rec. 709 RGB triplet. (As an example, the mean spectra and first three eigencolors for blue-green Munsell colors are shown in FIG. 12.)

Unfortunately, the boundaries between the Munsell hue groups are curved. Ayala et al. [2006] approximated these boundaries using straight lines, potentially misclassifying the target color and using the wrong set of mean spectra and dominant eigencolors to reconstruct the SRD.

The solution to this problem is, given an RGB triplet whose values are within the range of [0, 100], to calculate the luminance Y and the chromaticities xy in accordance with Equations 1 and 3 respectively. Then, in accordance with ASTM Standard D1535-08, Standard Practice for Specifying Color by the Munsell System, find the closest Munsell value V according to:

| V | Y |
|---|---|
| 1 | 1.18 |
| 2 | 3.05 |
| 3 | 6.39 |
| 4 | 11.70 |
| 5 | 19.27 |
| 6 | 29.30 |
| 7 | 42.00 |
| 8 | 57.62 |
| 9 | 76.70 |
| 10 | 100.00 | where Y is given by:

$$Y = 0.00081939V^5 - 0.020484V^4 + 0.23352V^3 - 0.22533V^2 + 1.1914V \quad (23)$$

The closest Munsell color may then be found by searching the Munsell renotation table as presented in Newall, S. M, D. Nickerson, and D. B. Judd. 1943, "Final Report of the O.S.A. Subcommittee on the Spacing of the Munsell Colors," Journal of the Optical Society of America 33(7):385-418. The Munsell notation for this color, for example, 7.5PB 8/6, immediately identifies the hue group and hence the appropriate set of mean spectra and dominant eigencolors to use.

As will be appreciated by those skilled in the art, the Munsell color system is one of many possible color space divisions. Any other color space, such as for example the OSA-UCS and Swedish NCS systems (e.g. Kuehni, R. G. 2003, Color Space and its Divisions: Color Order from Antiquity to the Present, New York, N.Y.: John Wiley & Sons, Chapter 7) may be employed for the purposes of determining the mean spectra and dominant eigencolors of a subset of the color space.

A further limitation of the approach of Ayala et al. [2006] is that pastel colors (i.e., those as identified as "white" in FIG. 11) may not be correctly classified as one of the ten hue groups. A novel improvement of the approach of Ayala et al. [2006] is therefore to consider all pastels colors as a separate "neutral" hue group and perform principal components analysis on this group. For the purpose of identifying Munsell colors within this group, an example criterion could be, for example, any color with a Munsell chroma value of 2.5 or less.

F. Multiple Reflections

From Equation 16, consecutive reflections of light emitted by an illuminant from n surfaces implies:

$$R[\lambda] \approx \Pi_{k=1}^n (V_0[k][\lambda] + \Sigma_{j=1}^3 D[k][j] V[k][j][\lambda]) \qquad (24)$$

In principle, this means that the equation has $4^n$ terms to be summed and multiplied, which become unmanageable after even one reflection when thousands of surfaces may be involved. However, the eigencolors are by definition orthogonal, and so an equivalent equation is:

$$R[\lambda] \approx \Pi_{k=1}^n V_0[k][\lambda] + \Sigma_{j=1}^3 (\Pi_{k=1}^n D[k][j] V[k][j][\lambda]) \qquad (25)$$

In other words, the mean spectra and dominant eigencolors can be consecutively multiplied for each reflection, and the four terms summed afterwards.

As noted by Fairman and Brill [2004], it is not strictly necessary to subtract the mean spectrum $V_0$ before calculating the eigencolors of a set of SRDs. Rather than subtracting the mean spectrum before calculating the eigencolors of the covariance matrix, it is equally valid to calculate the eigencolors of the set of SRDs directly. In doing so, Equation 25 becomes:

$$R[\lambda] \approx \Sigma_{j=1}^3 (\Pi_{k=1}^n D[k][j] V[k][j][\lambda]) \qquad (26)$$

which is identical in form to the independent multiplication of ITU Rec. 709 triplet values in representing multiple reflections between surfaces.

Figure 13:
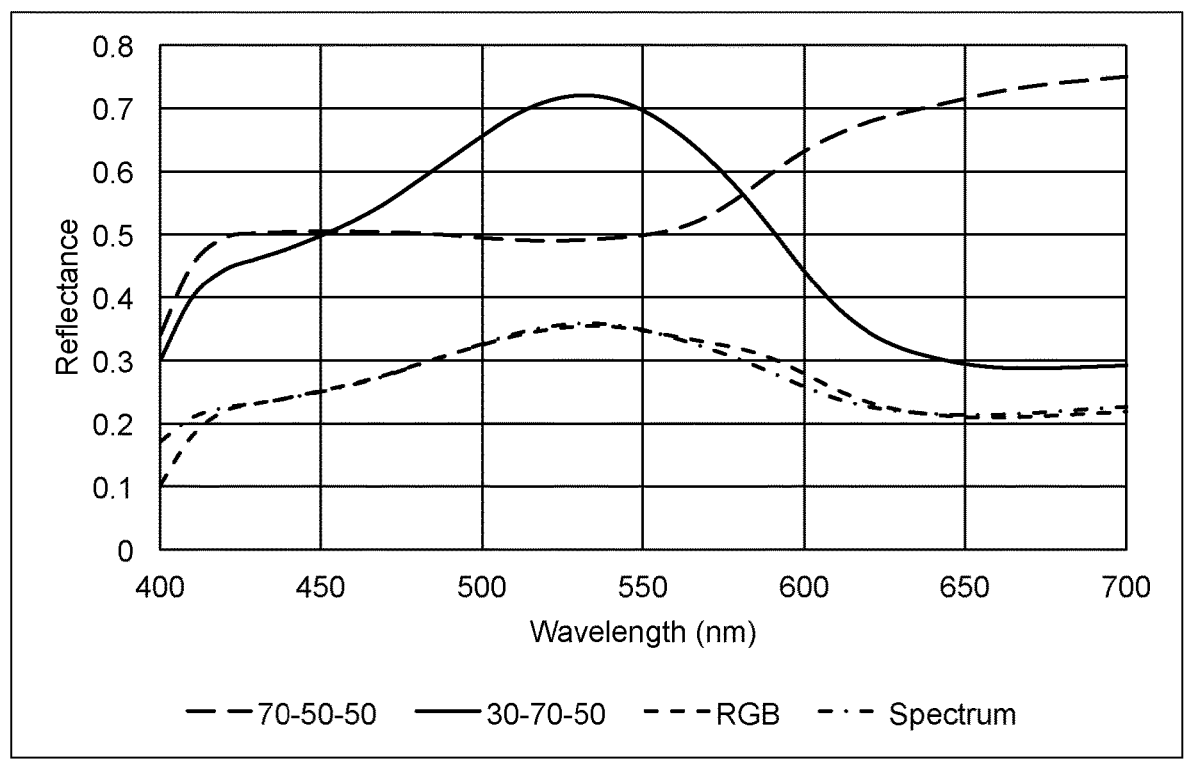
FIG. 13 shows the spectral reflectance distributions of light from an equal-energy illuminant consecutively reflected from two colored surfaces.

ITU Rec. 709 red, green, and blue colors are orthogonal in their own three-dimensional color space, but they cannot be linearly transformed into the n-dimensional eigencolors space. However, FIG. 13 shows an example the reflection of light emitted from a CIE Illuminant E (equal-energy) first by a rose-colored surface described by the RGB triplet [70, 50, 50] and second by a green-colored surface described by the RGB triplet [30, 70, 50]. The "Spectrum" plot shows the result of reconstructing the SRDs of both surfaces and multiplying them on a per-wavelength basis, while the "RGB" plot shows the result of multiplying the two RGB triplet to obtain the triplet [21, 35, 25] (representing a dark green). Apart from differences below 420 nm, the two SRDs are almost identical. It is therefore sufficient to calculate the reflection of light between surfaces in ITU Rec. 709 RGB color space and reconstruct the SRD from the resultant RGB values for each sampled point on any surface using the approach of either Fairman and Brill [2004] or Ayala et al. [2006], or any other approach that enables a physically plausible SRD to be reconstructed from a set of tristimulus values, with or without a mean spectrum.

It should also be noted that while the preceding analysis has assumed a visible light spectrum of 400 nm to 700 nm for architectural lighting design and analysis purposes, it may trivially be extended to the spectral range of 350 nm to 800 nm to represent the needs of horticultural lighting design and analysis purposes if the set of measured SRDs includes this range.

G. Spectral Transmittance Reconstruction

As previously noted, it is reasonable to reconstruct a physically plausible STD of architectural and horticultural glazing products using a natural cubic spline with the RGB triplet values as knots. This can be done by dividing the visible spectrum of 400 nm to 700 nm into three equally-spaced color bands with centers at $x_1 = 475$ nm (blue), $x_2 = 550$ nm (green) and $x_3 = 625$ nm (red), and assigning the corresponding spectral transmittance values $x_1 = B$, $y_2 = G$ and $y_3 = R$ respectively as spline knots.

The cubic spline is defined by the equation:

$$\begin{bmatrix} a_{11} & a_{12} & 0 \\ a_{21} & a_{22} & a_{23} \\ 0 & a_{32} & a_{33} \end{bmatrix} \begin{bmatrix} k_1 \\ k_2 \\ k_3 \end{bmatrix} = \begin{bmatrix} b_1 \\ b_2 \\ b_3 \end{bmatrix} \qquad (27)$$

with:

$$a_{11} = \frac{2}{x_1 - x_0} \qquad (28)$$

$$a_{12} = a_{21} = \frac{1}{x_1 - x_0} \qquad (29)$$

$$a_{11} = \frac{2}{x_1 - x_0} \qquad (30)$$

$$a_{22} = 2\left(\frac{1}{x_1 - x_0} + \frac{1}{x_2 - x_1}\right) \qquad (31)$$

$$a_{23} = a_{32} = \frac{1}{x_2 - x_1} \qquad (32)$$

$$a_{33} = \frac{2}{x_2 - x_1} \qquad (33)$$

$$b_1 = 3\frac{(y_1 - y_0)}{(x_1 - x_0)^2} \qquad (34)$$

$$b_2 = 3\left(\frac{(y_1 - y_0)}{(x_1 - x_0)^2} + \frac{(y_2 - y_1)}{(x_2 - x_1)^2}\right) \qquad (35)$$

$$b_3 = 3\frac{(y_2 - y_1)}{(x_2 - x_1)^2} \qquad (36)$$

Solving for $k_1$, $k_2$ and $k_3$ using the Thomas algorithm, we have:

$$c = a_{12}/a_{11} \qquad (37)$$

$$d = a_{23}/(a_{22} - a_{21}c) \qquad (38)$$

$$e = b_1/a_{11} \qquad (39)$$

$$f = (b_2 - a_{21}e)/(a_{22}a_{21}c) \qquad (40)$$

$$g = (b_3 - a_{32}f)/(a_{33} - a_{32}d) \qquad (41)$$

For the forward sweep and, using back substitution:

$$k_3 = g \qquad (42)$$

$$k_1 = f - dk_3 \qquad (43)$$

$$k_1 = e - ck_2 \qquad (44)$$

We then have:

$$y = (1-t)y_{i-1} + ty_i + t(1-t)(a_i(1-t) + b_i t) \qquad (45)$$

where i=2, 3 and:

$$t = (x - x_{i-1})/(x_i - x_{i-1}) \qquad (46)$$

$$a_i = k_{i-1}(x_i - x_{i-1}) - (y_i - y_{i-1}) \qquad (47)$$

$$b_i = -k_{i-1}(x_i - x_{i-1}) + (y_i - y_{i-1}) \qquad (48)$$

The natural cubic spline has constant slope $k_1$ below 475 nm and $k_3$ above 625 nm. The STD values should be clipped to the range of [0, 1] to ensure a physically realizable STD, and should further be scaled such that the sum of its values over the range of 400 nm to 700 nm equals that of the average of the RGB values.

As will be appreciated by those skilled in the art, any other suitable spline function may be used for the interpolation of a physically plausible spectral transmittance distribution.

H. Spectral Irradiance Prediction

Given a virtual architectural or horticultural environment in which the distribution of light is determined within the ITU Rec. 709 RGB color space, there is a need to predict the spectral irradiance distribution for an arbitrary position and view direction within the environment. This is equivalent to positioning and orienting a spectroradiometer with a cosine-correction diffuser in a physical environment.

Figure 14:
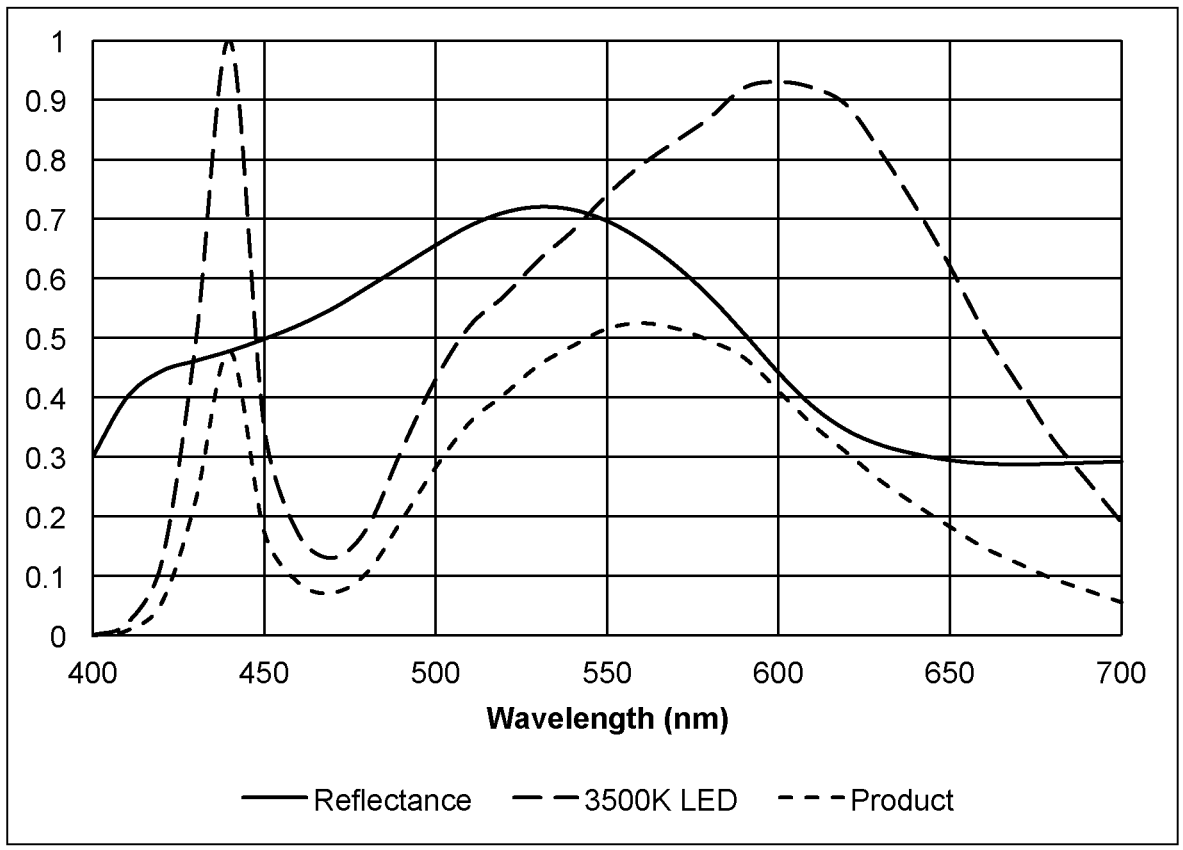
FIG. 14 shows the SPD of light emitted by a 3500K LED that has been reflected from a colored surface.

A key observation is that the SPD of light reflected from or transmitted by a surface is directly proportional to the SPD the light source multiplied by the SRD or STD of the surface on a per-wavelength basis. This operation can be applied on a recursive basis as the light is reflected from or transmitted by consecutive surfaces. As an example, FIG. 14 shows the SPD of light emitted by a 3500K white light-emitting diode (LED) that has been reflected from a green-colored surface described by the RGB triplet [30, 70, 50].

A virtual environment may have one or more light sources, each with its own SPD. For example, an interior environment may have a combination of LED module and fluorescent lamp luminaires for which measured SPDs are available. Color-changing LED luminaires may further have two or more color channels (for example, warm white and cool white or red, green, blue and amber), each with its own SPD.

As another example, daylight consists of direct sunlight and diffuse daylight. Direct sunlight has an SPD described by a CIE D55 daylight illuminant, but the SPD of diffuse daylight varies spatially across the sky dome, with color temperatures from ranging approximately 4000K to 20,000K, depending on sky conditions and solar position. For computational purposes, the sky dome can be divided into, for example, 256 patches and the SPD of each patch calculated using a sky model such as that described by Bruneton, E., and F. Neyret, 2008, "Precomputed Atmospheric Scattering," Eurographics Symposium on Rendering 2008, wherein the sky model parameters may be obtained from in situ measurements of direct normal solar and diffuse sky irradiance, historical weather data, or a trained artificial intelligence engine in accordance with U.S. Pat. Nos. 9,078,299 and 9,955,552.

Figure 15:
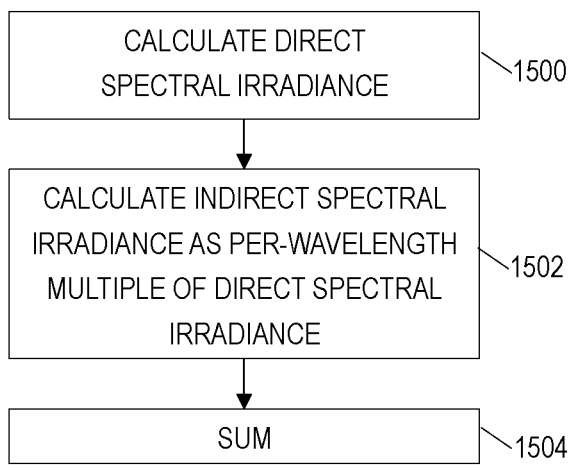
FIG. 15 shows a flowchart of an overview of a method of calculating spectral irradiance in a virtual environment, according to an embodiment of the present invention.

With this, an overview of the method of spectral irradiance prediction is shown in FIG. 15. In step 1500, a direct spectral irradiance is calculated for an arbitrary position and arbitrary direction due to light sources in a virtual model of the environment. In step 1502, an indirect spectral irradiance is calculated for the same position and direction due to reflections from surfaces in the virtual environment, the indirect spectral irradiance calculated as a per-wavelength multiple of the direct spectral irradiance. In step 1504 the direct and indirect spectral irradiances are summed to result in the spectral irradiance distribution.

An exemplary method of spectral irradiance prediction is expressed in more detail in pseudocode as:

```
Group light sources according to SPD
Assign RGB colors to opaque surfaces
Assign STDs to transparent surfaces
FOR each light source group
    Calculate group RGB solution
ENDFOR
Position and orient spectroradiometer
Reset spectral irradiance
```

-continued

Figure 16:
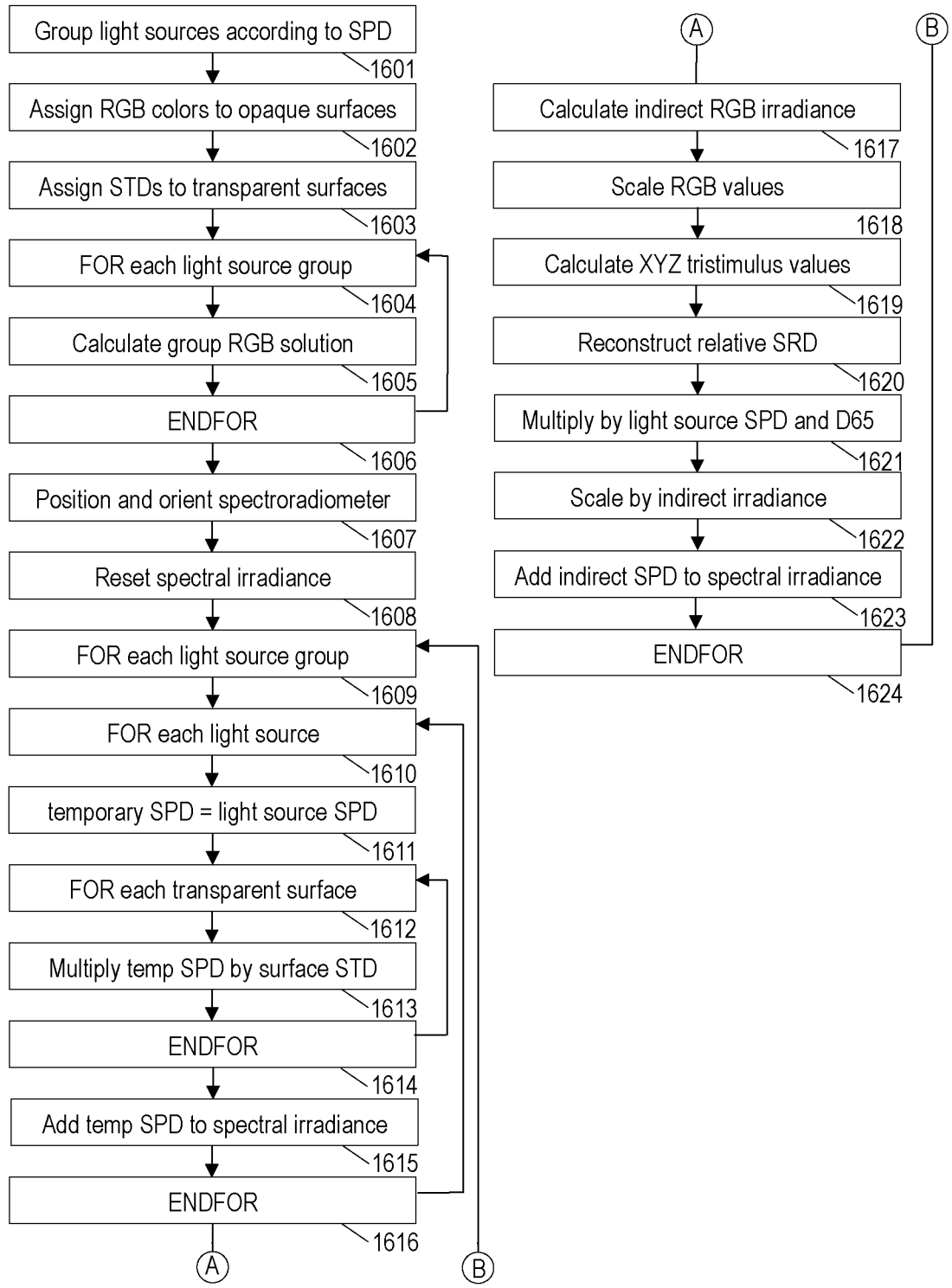
FIG. 16 shows a flowchart of a method of calculating spectral irradiance in a virtual environment, according to an embodiment of the present invention.

```
FOR each light source group
    FOR each light source
        temporary SPD = light source SPD
        FOR each transparent surface
            Multiply temporary SPD by surface STD
        ENDFOR
        Add temporary SPD to spectral irradiance
    ENDFOR
    Calculate indirect RGB irradiance
    Scale RGB values
    Calculate XYZ tristimulus
    Reconstruct relative SRD
    Multiply by light source SPD and D65
    Scale to indirect irradiance
    Add indirect SPD to spectral irradiance
ENDFOR
``` which is shown as a flowchart in FIG. 16.

In Step 1601, the light sources are grouped according to their common SPDs. This may include electric light sources, individual channels of color-changing luminaires, direct sunlight, and sky patches.

In Step 1602, the colors of opaque surfaces are assigned ITU Rec. 709 RGB triplets that represent their chromaticity and relative luminance, assuming a reference illuminant. In this embodiment, the reference illuminant is CIE D65. The RGB color is typically chosen by the user of the system that performs the spectral irradiance prediction. The user visually assesses a selection of colors of the virtual environment that are displayed on the computer monitor. If the monitor is properly calibrated, the colors will appear as if they were Munsell or Pantone color swatches viewed under direct sunlight on a clear day, which has a spectral power distribution with a color temperature of 6500K; that is, CIE D65. To generalize this, the illuminant assumed when choosing the RGB colors may be different in other embodiments.

In Step 1603, either measured STDs or their cubic spline approximations are assigned to transparent surfaces.

In Steps 1604 through 1606, each light source group is processed.

In Step 1605, the spatial distribution of light emitted by the group light sources within the virtual environment is calculated in ITU Rec. 709 RGB color space. This step may be implemented using known global illumination techniques, such as photon mapping or the radiosity method as disclosed in Ashdown, I., 1994 Radiosity: A Programmer's Perspective, New York, N.Y.: John Wiley & Sons.

In Step 1607, a virtual spectroradiometer is positioned and oriented in the virtual environment, in an arbitrary position and arbitrary orientation.

In Step 1608, the spectral irradiance distribution to be predicted by the virtual spectroradiometer is reset for all wavelengths.

In Steps 1609 through 1624, each light source group is processed.

In Steps 1610 through 1616, each light source within the light source group is processed.

In Step 1611, a temporary SPD is initialized with the light source SPD. This step takes into account the irradiance due to the distance from the point light source, or the irradiance due to a parallel light source such as direct sunlight or a sky patch as disclosed in U.S. Pat. No. 9,955,552.

In Steps 1612 through 1614, each intervening transparent surface between the light source and the spectroradiometer is processed. This step takes into account Fresnel transmission losses through transparent materials based on the view direction between the spectroradiometer and the light source and the transparent surface normal.

In Step 1613, the temporary SPD is multiplied on a per-wavelength basis by the transparent surface STD.

In Step 1615, the temporary SPD, which represents the spectral power distribution of the direct irradiance of the spectroradiometer due to the light source, is added to the spectral irradiance distribution.

When Step 1616 completes, the spectral irradiance due to all of the light sources visible, possibly through intervening transparent surfaces, to the spectroradiometer have been processed.

In Step 1617, the indirect ITU Rec. 709 RGB irradiance due to all opaque, translucent and transparent surfaces visible to the spectroradiometer is calculated using known techniques, such as the virtual photosensor method disclosed in U.S. Pat. No. 9,955,552. The result is an RGB triplet representing the CIE chromaticity xy and illuminance Y of the light incident upon the spectroradiometer.

In Step 1618, the RGB value scaled such that the maximum value is approximately 0.85. This is a heuristic value intended to ensure that the reconstructed relative SRD will not need to be clipped to the range of [0, 1]. The exact value will depend on the mean and first three eigencolors of the set of color samples used to construct the spectral reflectance reconstruction eigensystem.

In Step 1619, the CIE XYZ tristimulus coordinates are calculated using Equation 1, i.e. an indirect tristimulus irradiance is calculated.

In Step 1620, a physically plausible relative SRD is calculated using the approach of Fairman and Brill [2004], Ayala et al. [2006], or another suitable spectral reflectance distribution reconstruction method.

In Step 1621, the relative SRD is multiplied on a per-wavelength basis by the SPD of the light source group and the CIE D65 illuminant.

In Step 1622, the resultant SPD is scaled such that its integrated irradiance is equal to the average of the indirect RGB irradiance values.

In Step 1623, the indirect SPD, representing the spectral irradiance distribution of light reflected from all visible opaque and transparent surfaces in the environment, is added to the spectral irradiance.

I. Daylight Harvesting Controller

Figure 17:
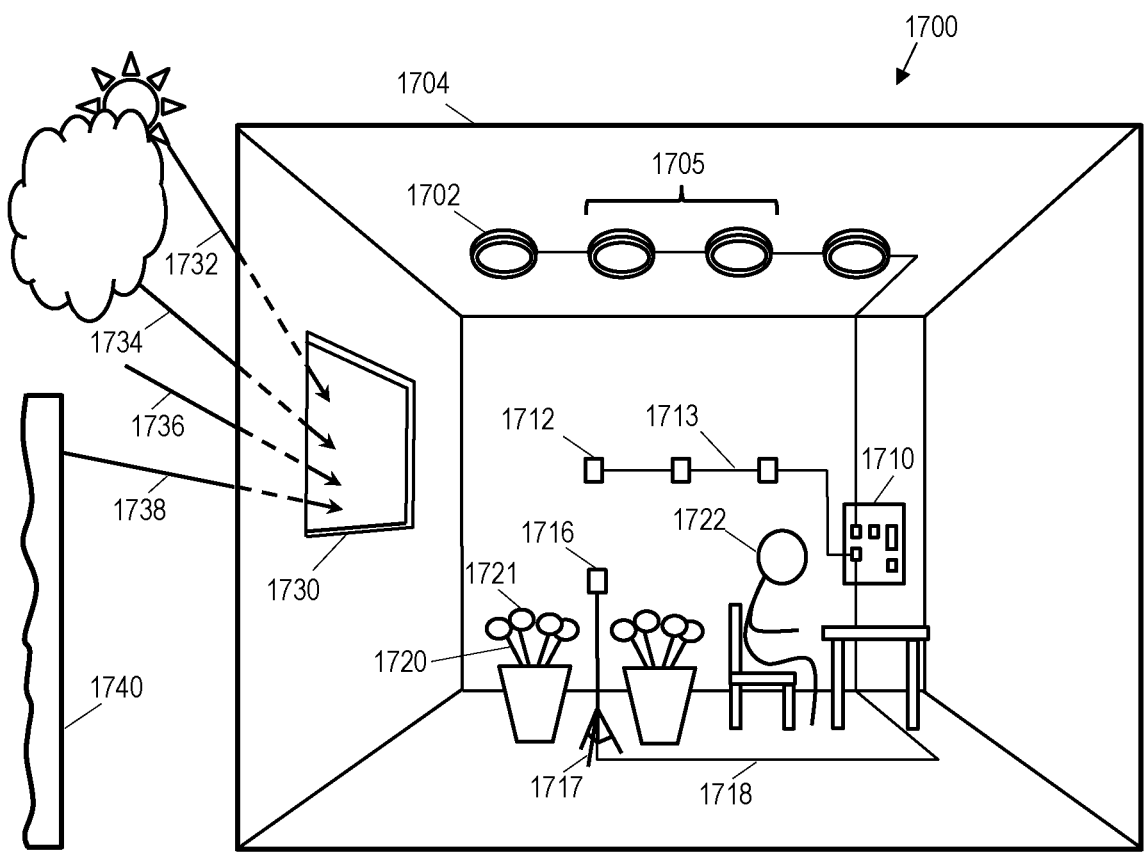
FIG. 17 shows a schematic representation of a system for spectral lighting control, according to an embodiment of the present invention.

Referring to FIG. 17, an exemplary system 1700 for implementing the method of FIG. 16 is shown. System 1700 includes one or more luminaires 1702 that are installed in an enclosed environment 1704, such as a room. The room may be an office, a living space, a shopping space, a foyer, a transit space or a greenhouse, for example. Some of the luminaires 1702 are grouped into one or more subsets 1705 of the luminaires. The system 1700 includes a daylight harvesting controller 1710 (or lighting controller) that is connected to the luminaires 1702.

Optionally, one or more sensors 1712 are mounted on the walls, ceiling, floor and/or other permanent structural feature of the environment 1704 via connections 1713. The controller 1710 is also connected to one or more optional sensors 1716 that are mounted on movable structures 1717 and connected to the controller via connections 1718. In this example, the sensor 1716 is located in the vicinity of plants 1720 so as to detect the spectral irradiance distribution incident upon the plant canopy 1721.

An occupant 1722 is also in the environment 1704.

Natural light enters the environment via window 1730, which has a transparent surface or a translucent surface. The natural light includes one or more of direct sunlight 1732, diffuse light 1734 from clouds, diffuse light 1736 from areas of the sky without clouds, and light 1738 reflected from nearby buildings 1740 or other outdoor structures.

The controller 1710 is configured to control the spectral light distribution emitted by the luminaires 1702, either individually or as subsets 1705. The sensors 1712, 1716 detect one or more properties of the light incident upon them, such as irradiance and spectral irradiance. The lighting level in the environment is adjustable by the occupant 1722, via a user interface on the controller 1710.

In other embodiments, one or more of the connections between the controller 1710 and the luminaires 1702 and sensors 1712, 1716 are wireless.

Figure 18:
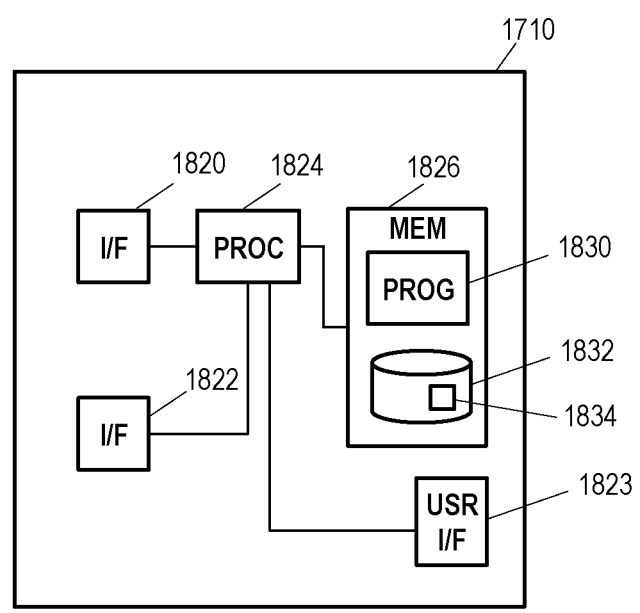
FIG. 18 shows a block diagram of a lighting control unit, according to an embodiment of the present invention.

FIG. 18 shows the exemplary lighting controller 1710 in more detail. The controller 1710 includes one or more interfaces 1820 via which the luminaires 7602 are connected, one or more interfaces 1822 via which the sensors 1712, 1716 are connected, and one or more user interfaces 1823 via which occupants of the environment 1704 are able to adjust the level (illuminance or irradiance) of the lighting within the environment. The user interface(s) 1823 also allows the user to adjust the emitted SPD of the luminaires 1702 individually, collectively or as a subset 1705. A processor 1824, which may include multiple constituent processors, is connected to the interfaces 1820, 1822, 1823 and also to one or more computer-readable memories 1826 storing a program 1830 in the form of computer-readable instructions, which, when executed by the processor, cause the controller to follow the process described in relation to FIG. 16. The memory 1826 also stores computer-readable data 1832, which is used by the processor 1824 to run the program 1830. The data 1832 is created by the program 1830, by an external program, or both. Data 1832 includes a model of a virtual environment 1834, which corresponds to the environment 1704 and its light sources 1702,1732, 1734,1736,1738.

Minimizing energy consumption while maintaining optimal occupant comfort is basically a multivariate optimization problem, where energy consumption needs to be minimized while respecting the needs of the occupants. Different occupants have different needs, and different tasks require different levels of lighting (illuminance or irradiance, and emitted SPD) depending on the level of detail that must be discerned. Various health and safety regulations specify minimum requirements for lighting depending on the task at hand, and these predetermined requirements include, for example, minimum intensity levels and the ability to accurately distinguish different colors. For architectural applications, the lighting controller 1710 minimizes energy consumption by, for example, turning off the luminaires whenever there is daylight in the room. However, the room occupants may experience visual discomfort working in areas of the room where there is insufficient illumination. The controller therefore has to ensure that a minimum illumination level is provided whenever the room is occupied. For horticultural applications, the controller minimizes energy consumption by, for example, adjusting the SPD of LED-based luminaires for maximum photosynthetically active radiation (PAR) efficacy. However, sun-tolerant plants may exhibit undesirable shade-avoidance behaviors when the ratio of red light (600 nm to 700 nm) to far-red light (700 nm to 800 nm) is too low or there is insufficient blue (400 nm-500 nm) light. The lighting controller therefore ensures that an appropriate balance of blue, red, and far-red light is maintained for the specific plant species under cultivation.

In an embodiment, the method of FIG. 16 is applied to an architectural environment (such as an office building) or a horticultural environment (such as a greenhouse), wherein a predictive daylight harvesting controller as disclosed in, for example, U.S. Pat. Nos. 9,078,299 and 9,955,522, is used to monitor and predict the spectral power distribution of daylight entering an interior space and modify the spectral power distribution of the electric lighting as required to maintain a comfortable luminous environment for the occupants or an optimal environment for plant health and growth.

In another embodiment, the method of FIG. 16 is applied to an architectural environment (such as an office building) or an enclosed horticultural environment (such as a greenhouse), wherein a colorimeter or spectroradiometer is used to monitor the spectral irradiance at predetermined positions within the environment, and a predictive lighting controller modifies the spectral power distribution of the electric lighting as required to maintain a comfortable luminous environment for the occupants or an optimal environment for plant health and growth.

As an example, the occupant of an office space may change the color temperature of color-tunable luminaires. The predictive lighting controller may determine that a predetermined dosage of melanopic flux necessary for proper circadian rhythm synchronization of the occupants will not be achieved with existing spectral power distribution and may therefore modify the spectral power distribution such that the color temperature remain the same but the melanopic content is increased, as disclosed for example in U.S. Pat. No. 8,506,612.

As another example, a floriculturist may choose to change the ratio of red to far-red radiation (R/FR) at night emitted by horticultural luminaires in a greenhouse or in an enclosed vertical farm to force or delay plant flowering. The method of FIG. 16 may then be used to predict the R/FR ratio at the leaf canopy of the plants, taking into consideration direct light from other light sources and indirect light reflected from surfaces. Of course, any other desired relative spectral power distribution may also be considered, depending upon the SPD requirements of the specific crop.

As yet another example, a horticulturalist may determine that the circadian or circannual rhythms of a specific plant species being grown in a greenhouse environment, requires a specific sequence of temporal changes in SPD of daylight near dawn and dusk. Based on the predicted weather conditions as determined by the lighting controller, a predetermined sequence of SPD and intensity changes in the irradiation provided by the supplemental electric lighting system may be effected to ensure proper circadian or circannual rhythm entrainment.

Feedback through photosensors, colorimeters, and spectroradiometer, interpolated data, stored data including historical data, or any combination of these methods can be used to detect changes to spectral power distribution of the light sources, as well as any ambient changes that may affect the environment.

While the foregoing description has been made largely with reference to human and plant life forms, it is also within the purview of the present invention to use the teachings herein for aquaculture and animal husbandry. In enclosed environments such as fish farms and fish tanks, for example, light with the optimum level (irradiance or illuminance) and spectral content is provided for the health, visual comfort and growth of sturgeon, salmon, clams, mussels etc. In other enclosed aquatic environments, light with the optimum level (irradiance or illuminance) and spectral content is provided for the health and growth of seaweed, for example. In the case of animal husbandry, light with the optimum level (irradiance or illuminance) and spectral content is provided in enclosed environments such as barn areas, for the health and visual comfort of animals such as dairy cattle and egg-producing chickens.

The embodiments of the invention may be varied in many ways. Such variations are not to be regarded as a departure from the scope of the invention, and all such modifications as would be obvious to one skilled in the art are intended to be included within the scope of the claims.

I claim:

1. A method of predicting a spectral irradiance distribution for an arbitrary position and arbitrary view direction in a virtual environment, comprising the steps of:
    calculating, by a processor, a direct spectral irradiance for said position and direction due to one or more light sources illuminating the virtual environment;
    calculating, by the processor, an indirect spectral irradiance for said position and direction due to reflections from one or more surfaces in the virtual environment, said indirect spectral irradiance calculated as a per-wavelength multiple of the direct spectral irradiance; and
    summing, by the processor, the direct spectral irradiance and the indirect spectral irradiance to result in the spectral irradiance distribution.

2. The method of claim 1, wherein calculating the indirect spectral irradiance comprises:
    assigning RGB triplets to one or more surfaces in the virtual environment based on a reference illuminant; and
    for each light source:
        calculating, by the processor, an indirect tristimulus irradiance for said position and direction due to reflections from one or more surfaces in the virtual environment;
        reconstructing, by the processor, a physically plausible relative spectral power distribution from the indirect tristimulus irradiance;
        multiplying, by the processor, said relative spectral power distribution by a spectral power distribution of the light source and the reference illuminant on a per-wavelength basis, to result in a spectral power distribution; and
        scaling, by the processor, the spectral power distribution according to the indirect tristimulus irradiance to obtain the indirect spectral irradiance for the light source; and
    summing the indirect spectral irradiances for the light sources.

3. The method of claim 2, wherein the indirect tristimulus irradiance is determined using a global illumination technique.

4. The method of claim 2, wherein the surfaces are opaque, translucent and transparent surfaces.

5. The method of claim 4, further comprising reconstructing a physically plausible relative spectral reflectance distribution of one of said opaque surfaces from the indirect tristimulus irradiance as a sum of mean spectra and weighted eigencolors of a set of representative opaque materials.

6. The method of claim 5, wherein:
    the set of representative opaque materials is divided into subsets according to divisions of a color space; and
    a set of eigencolors is determined for each subset.

7. The method of claim 6, wherein the color space division includes a subset comprised of pastel colors with limited chroma.

8. The method of claim 2, wherein there are one or more intervening transparent or translucent surfaces between the light sources and said position.

9. The method of claim 8, wherein the indirect tristimulus irradiance is expressed as tristimulus values, the method further comprising reconstructing a physically plausible relative transmittance distribution of a transparent or translucent surface from the tristimulus values as a spline function with the tristimulus values as spline knots.

10. A system for controlling spectral lighting in an enclosed environment, the system comprising electric lighting and a lighting controller connected to the electric lighting, the lighting controller configured to:
    determine, using a virtual environment that corresponds to the enclosed environment, a spectral irradiance distribution in the enclosed environment by:
        calculating a direct spectral irradiance for a position and direction due to light sources illuminating the enclosed environment;
        calculating an indirect spectral irradiance for said position and direction due to reflections from one or more surfaces in the enclosed environment, said indirect spectral irradiance calculated as a per-wavelength multiple of the direct spectral irradiance; and
        summing the direct spectral irradiance and the indirect spectral irradiance to result in the spectral irradiance distribution; and
    control, based on the spectral irradiance distribution, a spectral output of the electric lighting to maintain, in the spectral lighting, a spectral composition that meets a predetermined requirement suitable for a life form in the enclosed environment.

11. The system of claim 10 wherein the life form is a human and the predetermined requirement is for human visual comfort and health.

12. The system of claim 10 wherein:
    the life form is a plant;
    the spectral irradiance distribution is incident upon a canopy of the plant; and
    the predetermined requirement is for optimal plant health and growth.

13. The system of claim 12 wherein the spectral irradiance distribution is determined using a global illumination technique or using outputs from an artificial intelligence engine.

14. The system of claim 10, wherein the light sources are direct sunlight, diffuse daylight, and the electric lighting.

15. The system of claim 14 wherein the spectral irradiance distribution is determined using a mathematical sky model.

16. The system of claim 10 wherein the spectral irradiance distribution is determined using outputs from a trained artificial intelligence engine.

17. The system of claim 10 wherein:
    the life form is a human;
    the lighting controller is configured to predict a melanopic flux from the spectral irradiance distribution; and
    the predetermined requirement is a dosage of melanopic flux necessary for proper circadian rhythm synchronization of the human.

18. The system of claim 17 wherein the melanopic flux is predicted using a global illumination technique or using outputs from an artificial intelligence engine.

19. The system of claim 10 wherein the lighting controller is configured to control a subset of the electric lighting to maintain the predetermined requirement.

20. The system of claim 10, wherein the lighting controller is configured to minimize energy consumption of the electric lighting while maintaining the predetermined requirement.

21. The system of claim 10, further comprising a sensor for measuring a further spectral irradiance distribution in the enclosed environment, wherein the lighting controller is further configured to control the spectral lighting based on the further spectral irradiance distribution.

22. The system of claim 10 wherein the life form is animal and the predetermined requirement is for animal visual comfort and health.

23. The system of claim 10 wherein the life form is an aquatic animal and the predetermined requirement is for visual comfort and health of the aquatic animal.

24. The system of claim 10 wherein the life form is an aquatic plant and the predetermined requirement is for optimum growth and health of the aquatic plant.

25. A lighting controller comprising a processor and computer-readable memory storing computer-readable instructions, which, when executed by the processor cause the lighting controller to predict a spectral irradiance distribution for an arbitrary position and arbitrary view direction in a virtual environment, by:
    calculating a direct spectral irradiance for said position and direction due to one or more light sources illuminating the virtual environment;
    calculating an indirect spectral irradiance for said position and direction due to reflections from one or more surfaces in the virtual environment, said indirect spectral irradiance calculated as a per-wavelength multiple of the direct spectral irradiance; and
    summing the direct spectral irradiance and the indirect spectral irradiance to result in the predicted spectral irradiance distribution.

26. The lighting controller of claim 25 in combination with electric lighting in a closed environment that corresponds to the virtual environment and a sensor in the closed environment, the lighting controller connected to the electric lighting and sensor, the lighting controller configured to:
    determine an actual spectral irradiance distribution in the enclosed environment from a measurement obtained from the sensor; and
    control, taking into account one or both of the predicted and actual spectral irradiance distributions, a spectral output of the electric lighting to maintain, in the spectral lighting, a spectral composition that meets a predetermined requirement suitable for a life form in the enclosed environment.

27. The lighting controller of claim 26, wherein the life form is human, plant, animal or aquaculture.

* * * * *